United States Patent
Seemeyer et al.

(10) Patent No.: US 11,685,875 B2
(45) Date of Patent: *Jun. 27, 2023

(54) CONVEYOR LUBRICANTS INCLUDING EMULSION OF A LIPOPHILIC COMPOUND AND AN EMULSIFIER AND/OR AN ANIONIC SURFACTANT AND METHODS EMPLOYING THEM

(71) Applicant: Ecolab USA Inc., St. Paul, MN (US)

(72) Inventors: Stefan Seemeyer, Hilden (DE); Eric D. Morrison, St. Paul, MN (US); Stephan Scharrenbach, Dusseldorf (DE); Claudia Caussin de Schneck, Dusseldorf (DE); Stefan Kupper, Langenfeld (DE); Peter Rich, Rosehill (AU); Colin Court, Quakers Hill (AU)

(73) Assignee: ECOLAB USA INC., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,973

(22) Filed: Jan. 13, 2022

(65) Prior Publication Data
US 2022/0204885 A1 Jun. 30, 2022

Related U.S. Application Data

(63) Continuation of application No. 17/076,048, filed on Oct. 21, 2020, now Pat. No. 11,254,894, which is a continuation of application No. 16/281,733, filed on Feb. 21, 2019, now Pat. No. 10,844,310, which is a continuation of application No. 15/492,459, filed on
(Continued)

(51) Int. Cl.
| | |
|---|---|
| C10M 169/04 | (2006.01) |
| C10M 173/02 | (2006.01) |
| C10M 105/38 | (2006.01) |
| C10M 129/44 | (2006.01) |
| B65G 45/02 | (2006.01) |
| B65G 45/10 | (2006.01) |
| C10M 129/40 | (2006.01) |
| C10M 129/68 | (2006.01) |
| C10M 133/06 | (2006.01) |
| C10M 137/04 | (2006.01) |
| C10N 30/06 | (2006.01) |
| C10N 30/10 | (2006.01) |
| C10N 30/00 | (2006.01) |
| C10N 40/00 | (2006.01) |

(52) U.S. Cl.
CPC .......... *C10M 169/04* (2013.01); *B65G 45/02* (2013.01); *B65G 45/10* (2013.01); *C10M 105/38* (2013.01); *C10M 129/40* (2013.01); *C10M 129/44* (2013.01); *C10M 129/68* (2013.01); *C10M 133/06* (2013.01); *C10M 137/04* (2013.01); *C10M 173/025* (2013.01); *C10M 2201/02* (2013.01); *C10M 2203/1006* (2013.01); *C10M 2207/022* (2013.01); *C10M 2207/024* (2013.01); *C10M 2207/125* (2013.01); *C10M 2207/126* (2013.01); *C10M 2207/128* (2013.01); *C10M 2207/283* (2013.01); *C10M 2207/289* (2013.01); *C10M 2207/2835* (2013.01); *C10M 2207/402* (2013.01); *C10M 2209/103* (2013.01); *C10M 2209/104* (2013.01); *C10M 2215/04* (2013.01); *C10M 2223/04* (2013.01); *C10N 2030/06* (2013.01); *C10N 2030/10* (2013.01); *C10N 2030/62* (2020.05); *C10N 2040/38* (2020.05)

(58) Field of Classification Search
CPC ...... C10M 2209/104; C10M 2209/105; C10M 2209/109; C10M 105/38; C10M 129/40; C10M 129/44; C10M 129/68; C10M 133/06; C10M 137/04; C10M 169/04; C10M 173/025; C10M 2201/02; C10M 2203/1006; C10M 2207/022; C10M 2207/024; C10M 2207/125; C10M 2207/126; C10M 2207/128; C10M 2207/283; C10M 2207/2835; C10M 2207/289; C10M 2207/402; C10M 2209/103; C10M 2215/04; C10M 2223/04; B65G 45/02; B65G 45/10; C10N 2030/06; C10N 2030/10; C10N 2030/62; C10N 2040/38
See application file for complete search history.

(56) References Cited

U.S. PATENT DOCUMENTS

| | | | |
|---|---|---|---|
| 4,753,742 A | 6/1988 | Wilhelm, Jr. | |
| 5,352,376 A | 10/1994 | Gurzmann et al. | |

(Continued)

FOREIGN PATENT DOCUMENTS

| | | |
|---|---|---|
| EP | 0656414 | 6/1995 |
| EP | 0712834 | 5/1996 |

(Continued)

OTHER PUBLICATIONS

Extended European Search Report for Application No. 18197273.8 dated Jan. 11, 2019.

*Primary Examiner* — Latosha Hines
(74) *Attorney, Agent, or Firm* — Merchant & Gould P.C.

(57) ABSTRACT

The present invention relates to conveyor lubricant compositions including an emulsion of a lipophilic compound and also including an emulsifier and/or an anionic surfactant. The present invention also relates to methods employing such lubricant compositions. In an embodiment, the method includes applying the present lubricant composition to a conveyor with a non-energized nozzle.

22 Claims, No Drawings

Related U.S. Application Data

Apr. 20, 2017, now Pat. No. 10,273,430, which is a continuation of application No. 14/216,418, filed on Mar. 17, 2014, now Pat. No. 9,783,760, which is a continuation of application No. 11/854,237, filed on Sep. 12, 2007, now Pat. No. 8,716,200.

(60) Provisional application No. 60/825,546, filed on Sep. 13, 2006.

(56) References Cited

U.S. PATENT DOCUMENTS

| | | | |
|---|---|---|---|
| 5,505,867 | A | 4/1996 | Ritter |
| 5,538,654 | A | 7/1996 | Lawate et al. |
| 5,559,087 | A | 9/1996 | Halsrud et al. |
| 5,641,734 | A | 6/1997 | Naegely |
| 5,773,391 | A | 6/1998 | Lawate et al. |
| 5,843,873 | A | 12/1998 | Butke et al. |
| 5,993,972 | A | 11/1999 | Reich et al. |
| 6,103,308 | A | 8/2000 | Floyd et al. |
| 6,162,771 | A | 12/2000 | Floyd et al. |
| 6,214,777 | B1 | 4/2001 | Li et al. |
| 6,255,341 | B1 | 7/2001 | Demichele et al. |
| 6,444,700 | B1 | 9/2002 | Demichele et al. |
| 6,514,551 | B1 | 2/2003 | Schur |
| 6,576,298 | B2 | 6/2003 | Bennett et al. |
| 6,673,753 | B2 * | 1/2004 | Person Hei .......... C10M 105/24 508/579 |
| 6,821,568 | B2 | 11/2004 | Bennett et al. |
| 6,855,676 | B2 * | 2/2005 | Li .................. C10M 111/04 508/250 |
| 7,297,666 | B2 * | 11/2007 | Kupper ............. C10M 173/025 508/486 |
| 7,741,257 | B2 * | 6/2010 | Valencia Sil ........ C10M 169/04 508/459 |
| 2002/0051850 | A1 * | 5/2002 | Bennett ................ C10M 171/00 208/19 |
| 2002/0115573 | A1 * | 8/2002 | Hei ....................... C10M 145/38 508/579 |
| 2002/0187188 | A1 | 12/2002 | Cherukuri |
| 2003/0198718 | A1 | 10/2003 | Schur |
| 2003/0207040 | A1 | 11/2003 | Bennett et al. |
| 2004/0053791 | A1 | 3/2004 | Langer et al. |
| 2004/0235679 | A1 | 11/2004 | Kurosky et al. |
| 2005/0070448 | A1 | 3/2005 | Küpper et al. |
| 2006/0211583 | A1 | 9/2006 | Valencia Sil et al. |
| 2008/0176778 | A1 | 7/2008 | Seemeyer et al. |

FOREIGN PATENT DOCUMENTS

| | | | |
|---|---|---|---|
| EP | 0714974 | 6/1996 | |
| EP | 1056359 | 9/2004 | |
| EP | 1080268 | 12/2005 | |
| JP | 2000129277 | 5/2000 | |
| JP | 2000514222 | 10/2000 | |
| JP | 4460166 | 8/2002 | |
| JP | 2004217866 | 8/2004 | |
| JP | 2007197580 | 8/2007 | |
| JP | 2007112917 | 10/2007 | |
| WO | WO93/09209 | 5/1993 | |
| WO | WO93/11865 | 6/1993 | |
| WO | WO-9311865 A1 * | 6/1993 | ............ A61K 8/062 |
| WO | WO 9401330 | 1/1994 | |
| WO | WO95/26710 | 10/1995 | |
| WO | WO99/43220 | 9/1999 | |
| WO | WO99/47127 | 9/1999 | |
| WO | WO99/54549 | 10/1999 | |
| WO | WO02/20380 | 3/2002 | |
| WO | WO2003/027217 | 4/2003 | |
| WO | WO2005/014764 | 2/2005 | |
| WO | WO2005/030917 | 4/2005 | |
| WO | WO2005/041671 | 5/2005 | |
| WO | WO2005/097064 | 10/2005 | |
| WO | WO2006/094387 | 9/2006 | |
| WO | WO2008/019797 | 2/2008 | |
| WO | WO 2008/048198 | 4/2008 | |

* cited by examiner

CONVEYOR LUBRICANTS INCLUDING EMULSION OF A LIPOPHILIC COMPOUND AND AN EMULSIFIER AND/OR AN ANIONIC SURFACTANT AND METHODS EMPLOYING THEM

CROSS REFERENCE TO RELATED APPLICATIONS

This application is a continuation of U.S. application Ser. No. 17/076,048, filed Oct. 21, 2020 which is a continuation of U.S. application Ser. No. 16/281,773, filed Feb. 21, 2019, now U.S. Pat. No. 10,844,310, which is a continuation of U.S. application Ser. No. 15/492,459, filed Apr. 20, 2017, now US. Pat. No. 10,273,430, issued Apr. 30, 2019, which is a continuation of U.S. application Ser. No. 14/216,418, filed Mar. 17, 2014, issued as U.S. Pat. No. 9,783,760 on Oct. 10, 2017, which is a U.S. application Ser. No. 11/854,237 filed Sep. 12, 2007, issued as U.S. Pat. No. 8,716,200 on May 6, 2014, which claims benefit of Provisional Application No. 60/825,546, filed Sep. 13, 2006, which applications are incorporated herein by reference.

FIELD OF THE INVENTION

The present invention relates to conveyor lubricant compositions including an emulsion of a lipophilic compound and also including an emulsifier and/or an anionic surfactant. The present invention also relates to methods employing such lubricant compositions. In an embodiment, the method includes applying the present lubricant composition to a conveyor with a non-energized nozzle.

BACKGROUND OF THE INVENTION

In commercial container filling or packaging operations, the containers typically are moved by a conveying system at very high rates of speed. Typically, a concentrated lubricant is diluted with water to form an aqueous dilute lubricant solution (i.e., dilution ratios of 100:1 to 500:1), and copious amounts of aqueous dilute lubricant solutions are typically applied to the conveyor or containers using spray or pumping equipment. These lubricant solutions permit high-speed operation of the conveyor and limit marring of the containers or labels, but also have some disadvantages. First, dilute aqueous lubricants typically require use of large amounts of water on the conveying line, which must then be disposed of or recycled, and which causes an unduly wet environment near the conveyor line. Second, some aqueous lubricants can promote the growth of microbes. Third, by requiring dilution of the concentrated lubricant dilution errors can occur, leading to variations and errors in concentration of the aqueous dilute lubricant solution. Finally, by requiring water from the plant, variations in the water can have negative side effects on the dilute lubricant solution. For example, alkalinity in the water can lead to environmental stress cracking in PET bottles.

When an aqueous dilute lubricant solution is used, it is typically applied at least half of the time the conveyor is running, and usually it is applied continuously. By running the aqueous dilute lubricant solution continuously, more lubricant is used than is necessary, and the lubricant concentrate drums have to be switched out more often than necessary.

"Dry lubes" have been described in the past as a solution to the disadvantages of dilute aqueous lubricants. A "dry lube" historically has referred to a lubricant composition with less than 50% water that was applied to a container or conveyor without dilution. However, this application typically required special dispensing equipment and nozzles and energized nozzles in particular. Energized nozzles refer to nozzles where the lubricant stream is broken into a spray of fine droplets by the use of energy, which may include high pressures, compressed air, or sonication to deliver the lubricant. Silicone materials have been the most popular "dry lube". However, silicone is primarily effective at lubricating plastics such as PET bottles, and has been observed to be less effective at lubricating on glass or metal containers, particularly on a metal surface. If a plant is running more than one type of container on a line, the conveyor lubricant will have to be switched before the new type of container can be run. Alternatively, if a plant is running different types of containers on different lines, the plant will have to stock more than one type of conveyor lubricant. Both scenarios are time consuming and inefficient for the plant.

It has been observed in the field that traditional glass and metal lubricants do not work well (i.e. do not produce an acceptable low coefficient of friction) when run in a dry mode, that is when applied for a period of time, and then turned off for a period of time while containers and packages continue to be moved along the conveyor surface.

Emulsions containing lipophilic oils including triglycerides have been shown to provide advantageous lubrication and cooling as a metal working fluid for processes such as rolling, forging, blanking, bending, stamping, drawing, stretch forming, milling, cutting, punching, spinning, extruding, coining, hobbing, swaging, and the like. These emulsions can even be used as dried on metal to give an opaque white film with an average coating weight of approximately 100 to 200 mg/ft$^2$ (approximately 1 to 2 microns average coating thickness). Metal working fluids are typically tested in the presence of copious amounts of lubricant as may be provided by high volume spraying or submersion, which conditions are not relevant to lubricating conveyors.

Accordingly there remains a need for improved conveyor lubricants that can be employed "dry" and that will provide effective lubrication even after contact with water or another aqueous composition (such as a beverage).

SUMMARY OF THE INVENTION

The present invention relates to conveyor lubricant compositions including an emulsion of a lipophilic compound and also including an emulsifier and/or an anionic surfactant. The present invention also relates to methods employing such lubricant compositions. In an embodiment, the method includes applying the present lubricant composition to a conveyor with a non-energized nozzle.

In an embodiment, the present method includes a method for lubricating the passage of a container along a conveyor. This method can include applying an lubricant composition to at least a portion of a container-contacting surface of the conveyor or to at least a portion of a conveyor-contacting surface of the container. This method can employ a lubricant composition including about 3 about 40 wt-% lipophilic compound; about 0.05 about 15 wt-% emulsifier, anionic surfactant, or mixture thereof; and about 55 to about 97 wt-% water. The lubricant composition can be applied diluted or undiluted. In an embodiment, the lubricant composition is applied undiluted.

Applying can include spraying the composition through a non-energized nozzle. In an embodiment, this method includes spraying an undiluted lubricant composition through a non-energized nozzle onto at least a portion of a container-contacting surface of the conveyor or to at least a portion of a conveyor-contacting surface of the container.

The present invention also relates to a conveyor lubricant composition. The composition can include lipophilic compound, anionic surfactant, and water. In an embodiment, the composition includes about 3 about 40 wt-% lipophilic compound, about 0.05 about 15 wt-% anionic surfactant, and about 55 to about 97 wt-% water. The lipophilic compound can include or be triglyceride. The lipophilic compound can include or be tri(caprate/caprylate) ester of glycerine; caprylate, caprate, cocoate triglyceride; soyate fatty acid ester of sucrose; diheptanoate ester of poly(ethylene glycol); or trimethylol propane trioleate. The anionic surfactant can include or be lecithin, glycerol monostearate monocitrate, oleyl-5EO-phosphate ester, short chain homopolymer of ricinoleic, or oleic acid.

The composition can also include emulsifier. The emulsifier can include or be lecithin, ethoxysorbitan monostearate, glycerol monooleate, 20 mole ethoxylated castor oil, or mixture thereof.

DETAILED DESCRIPTION OF THE INVENTION

Definitions

As used herein, weight percent (wt-%), percent by weight, % by weight, and the like are synonyms that refer to the concentration of a substance as the weight of that substance divided by the weight of the composition and multiplied by 100. Unless otherwise specified, the quantity of an ingredient refers to the quantity of active ingredient.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

By lipophilic compound, it is meant compounds which are insoluble in water and when mixed with water exist in a separate phase.

A colloid is defined by the Houghton-Mifflin American Heritage® Dictionary of the English Language as a system in which finely divided particles, which are approximately 10 to 10,000 angstroms in size, are dispersed within a continuous medium in a manner that prevents them from being filtered easily or settled rapidly.

The Present Conveyor Lubricants and Methods

The present invention relates to conveyor lubricant compositions including an emulsion of a lipophilic compound and also including an emulsifier and/or an anionic surfactant. The present invention also relates to methods employing such lubricant compositions. In an embodiment, the method includes applying the present lubricant composition to a conveyor through a non-energized nozzle.

Conveyor lubricants are applied to conveyors (e.g., conveyor belts made of stainless steel or of plastic (such as Delrin) wet or dry. Wet application employs nearly constant spraying of the conveyor with a dilute aqueous lubricant composition. Dry application employs intermittent application of a concentrate lubricant composition or a lubricant composition that includes less water than one used for wet application. A conveyor lubricant applied by the dry method should provide effective lubrication for the entire period between the intermittent applications. The dry applied conveyor lubricant can also advantageously provide effective lubrication even after water or an aqueous composition (e.g., a beverage) is applied to the lubricated conveyor. Water can contact the lubricated conveyor by spraying or by flow from rinsing of a beverage container. An aqueous composition, such as a beverage, can contact the lubricated conveyor, for example, by spilling.

Surprisingly, the present inventors have discovered that conveyor lubricant compositions including an emulsion of a lipophilic compound and also including an emulsifier and/or an anionic surfactant are effective as dry lubricants and are effective for lubricating a conveyor conveying glass containers. For example, embodiments of the present conveyor lubricant compositions including an emulsion of a lipophilic compound and also including an emulsifier and/or an anionic surfactant provide effective conveyor lubrication when applied by the dry method even after (e.g., for a longer time after) water or aqueous composition has been applied to the lubricated conveyor. This can be viewed as the water or aqueous composition failing to remove the lubricant from the conveyor.

In certain embodiments, the present emulsions can create a long-lasting lubricant film on the conveyor surface, that is resistant against water or beverage spillage for a longer period of time than conventional conveyor lubricants (e.g. glycerin). That is, the coefficient of friction increases only slowly to unacceptable levels such that the next of intermittent applications of lubricant occurs before the coefficient of friction increases to an unacceptable level.

Gaining this resistance can be referred to as "seasoning." A conveyor belt that is relatively more seasoned will show less of a COF increase from water spraying or beverage spilling than a belt that is relatively less seasoned. Such seasoning, increased resistance to exposure to water or beverage, or advantageous lubrication after water contact can be evaluated. Such evaluation can include, for example, measuring the COF while lubricant is being applied to the belt, subsequently measuring COF during a period when lubricant is not being applied, and finally during or after a period of water spraying (during which lubricant is not being applied). Seasoning, increased resistance, or advantageous lubrication will be evidenced by an increase in COF after water spraying that is smaller than an increase employing a control conventional lubricant. In an embodiment, when tested by the short track testing method described in the present examples, the COF using a composition according to the present invention remains below 0.4 even after spraying of water.

Surprisingly, it has been found that the seasoning properties of a lipophilic emulsion lubricant is improved by the addition of an anionic surfactant. Generally it is considered that anionic surfactants improve the detergency of compositions, that is, they facilitate removal of soils and especially lipophilic soils such as oils and greases. Anionic surfactants are used extensively in detergent systems for the purpose of improving the removal of lipophilic soils from surfaces and textiles. Therefore it would be expected that incorporation of anionic surfactants into a lubricant composition including a lipophilic emulsion would facilitate removing the lubricant from a conveyor surface upon contact with water. On this basis, it would be expected that a lipophilic emulsion lubricant compositions including anionic surfactant should give poorer seasoning properties relative to a composition without anionic surfactants. However it has been found that anionic surfactants can greatly increase the seasoning properties of present lubricants and the maintenance of effective lubrication after water spraying or rinsing.

Embodiments of the present compositions include water, for example, greater than or equal to about 50 wt-% water. Such embodiments can provide several advantageous properties. Including water in the concentrate composition can reduce problems associated with dilute (e.g., wet) lubricants. For example, the composition can be applied undiluted with standard application equipment (i.e., non-energized nozzles). By including some water, the composition can be applied "neat" or undiluted upon application resulting in one or more of: 1) drier lubrication of the conveyors and containers; 2) a cleaner and drier conveyor line and working area; or 3) reduced lubricant usage, which can reduce waste, cleanup, and disposal problems. Further, adding water to the composition and not requiring dilution upon application, dilution problems can be avoided along with problems that can be created by water (i.e., microorganisms and environmental stress cracking).

In an embodiment, the present compositions exhibit a decrease in COF after the composition is applied to the conveyor and the composition dries on the conveyor. In an embodiment, the present compositions maintain effective lubrication after the composition is applied to the conveyor and the composition dries on the conveyor. The invention provides a lubricant coating that reduces the coefficient of friction of coated conveyor parts and containers and thereby facilitates movement of containers along a conveyor line.

In an embodiment, the present lubricant compositions is compatible with non-refillable PET bottles useful for carbonated soft drinks as determined using a PET Stress Crack Test and with non-refillable barrier bottles used for beer as determined by a modified PET Stress Crack Test (see, e.g., Example 7). For example, the present composition can result in cracking of 4 or fewer bottles out of 56 tested in such a test. In an embodiment, the present composition can result in cracking of 4 or fewer bottles out of 96 tested in such a test.

In an embodiment, the present lubricant compositions is compatible with refillable PET bottles useful for carbonated soft drinks as determined using a PET Stress Crack Test for refillable bottles (see, e.g., Example 8). For example, the present composition can result in a grade in such a test of A or B. In an example, the present composition can result in a grade in such a test of A.

The Present Lubricant Compositions

The present invention relates to conveyor lubricant compositions including an emulsion of a lipophilic compound and also including an emulsifier and/or an anionic surfactant. In an embodiment, the present conveyor lubricant composition includes an emulsion of a lipophilic compound and an anionic surfactant. In an embodiment, the present conveyor lubricant composition includes an emulsion of a lipophilic compound, an anionic surfactant, and an emulsifier. In an embodiment, the present composition is of viscosity low enough that it can be applied to a conveyor with a non-energized nozzle. In an embodiment, the present composition includes greater than or equal to 50% water and need not be or is not diluted prior to applying it to a conveyor or container surface. In an embodiment, the present composition includes greater than or equal to 50% of a mixture of water and a water miscible compound of low viscosity, such as ethanol.

The lubricant composition can be a liquid or semi-solid at the time of application. In an embodiment, the lubricant composition is a liquid having a viscosity that will permit it to be pumped and readily applied to a conveyor or containers, and that will facilitate rapid film formation whether or not the conveyor is in motion. The lubricant composition can be formulated so that it exhibits shear thinning or other pseudo-plastic behavior, manifested by a higher viscosity (e.g., non-dripping behavior) when at rest, and a much lower viscosity when subjected to shear stresses such as those provided by pumping, spraying or brushing the lubricant composition. This behavior can be brought about by, for example, including appropriate types and amounts of thixotropic fillers (e.g., treated or untreated fumed silicas) or other rheology modifiers in the lubricant composition.

The lipophilic composition including lipophilic compound and emulsifier and/or anionic surfactant is "water-miscible", that is, it is sufficiently water-soluble or water-dispersible so that when added to water at the desired use level it forms a stable solution, emulsion or suspension. The desired use level will vary according to the particular conveyor or container application, and according to the type of lipophilic compound, emulsifier, and/or anionic surfactant employed.

In an embodiment, the present lubricant can be removed from the conveyor surface by cleaning the surface with a water-based cleaning agent. That is, it is sufficiently soluble or dispersible in water so that the coating can be removed from the container or conveyor using conventional aqueous cleaners, without the need for high pressure, mechanical abrasion or the use of aggressive cleaning chemicals. However, the lubricant should not be so water-soluble that it runs off the conveyor when it encounters water or spilled beverage normally present during the bottling process.

The present lubricant can include amounts of lipophilic compound, emulsifier and water or hydrophilic diluent such as: about 0.1 to about 30 wt-% of the lipophilic compound (exclusive of any water or other hydrophilic diluent that may be present if the lipophilic compound is, for example, an emulsion), about 0.05 to about 15 wt-% of the emulsifier, and about 55 to about 99.85 wt-% of water or hydrophilic diluent. The lubricant composition can contain about 0.2 to about 20 wt-% of the lipophilic compound, about 0.1 to about 10 wt-% of the emulsifier, and about 70 to about 99.7 wt-% of water or hydrophilic diluent. The lubricant composition can contain about 0.5 to about 15 wt-% of the lipophilic compound, about 0.2 to about 8 wt-% of the emulsifier, and about 77 to about 99.3 wt-% of water or hydrophilic diluent.

The Lipophilic Compound

The compositions of the present invention include a lipophilic compound. In an embodiment, the lipophilic compound is a water insoluble organic compound including two or more ester linkages. In an embodiment, the lipophilic compound is a water insoluble organic compound including three or more oxygen atoms. In an embodiment, the lipophilic compound is a water insoluble organic compound including three or more oxygen atoms, one ester group (which can include two of these oxygen atoms) and one or more remaining or free hydroxyl groups. In an embodiment, the lipophilic compound is an ester of a long chain carboxylic acid (e.g., a fatty acid) with a short chain (i.e., 5 or fewer carbon atoms) alcohol (e.g., methanol). In an embodiment, the lipophilic compound is an ester including a di-, tri-, or poly-hydric alcohol, such as glycerol, with 2 or more of the hydroxyl groups each being coupled to a carboxylic acid as an ester group.

Such lipophilic compounds include esters of monocarboxylic fatty acids and di- and poly-carboxylic acid compounds. Suitable fatty acid components of the ester include octanoic acid, nonanoic acid, decanoic acid, undecanoic acid, dodecanoic acid, palmitic acid, stearic acid, oleic acid, or mixture thereof. Suitable di- and poly carboxylic acid components of the ester include adipic acid, succinic acid, glutaric acid, sebacic acid, phthalic acid, trimellitic acid, and mixtures thereof. In esters with di-, tri-, or poly-hydric alcohols suitable carboxylic acid components include those listed above and also, for example, monocarboxylic acid components such as butanoic acid, hexanoic acid, heptanoic acid, or mixture thereof.

The esters can include any of a variety of alcohol moieties, such as monohydric fatty alcohols and di- and poly-hydric compounds. Suitable monohydric alcohol components of the ester include primary aliphatic alcohols, such as aliphatic hydrocarbon alcohols, for example, methanol, ethanol, and linear and branched primary alcohols with 3 to 25 carbon atoms. Suitable di- and poly-hydric alcohol components of the ester include those containing from 2 to about 8 hydroxy groups. such as alkylene glycols, e.g., ethylene glycol, diethylene glycol, neopentyl glycol, tetraethylene glycol, or mixture thereof. Additional suitable alcohol components of the ester include glycerine, erythritol, mannitol, sorbitol, glucose, trimethylolpropane (TMP), pentaerythritol, dipentaerythritol, sorbitan, or mixture thereof. The ester can include any of a variety of carboxylic acid and alcohol residues that provide a water insoluble (not capable to be dissolved in water to give clear solutions at concentrations greater than about 0.1% by weight at room temperature) ester that is a liquid, semi-solid, or a low melting solid. In lubricant compositions of the present invention, the lipophilic compound can be the dispersed phase in a colloidal dispersion.

Suitable lipophilic compounds include a triglyceride, a partial glyceride, a phospholipid, and the like.

The term triglycerides refers to substances having the general formula:

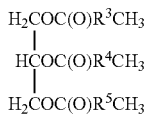

in which $R^3$, $R^4$, and $R^5$ are independently linear or branched, saturated and/or unsaturated, optionally hydroxy- and/or epoxy-substituted residues with 6 to 22, e.g., 12 to 18 carbon atoms.

The triglycerides can be of natural origin or produced synthetically. In an embodiment, the triglyceride has linear and saturated alkylene residues with chain length between 6 and 22 carbon atoms. They are optionally hydroxy- and/or epoxy-functionalized substances, such as e.g. castor oil or hydrogenated castor oil, epoxidized castor oil, ring-opening products of epoxidized castor oils of varying epoxy values with water and addition products of on average 1 to 100, e.g., 20 to 80 mol, or even 40 to 60 mol to these cited triglycerides.

Suitable triglycerides include those sold under the trade names Myritol 331, Myritol 312, Myritol 318, Terradrill V988, the Terradrill EM, which are commercially available from Cognis; and Miglyol 812 N and Miglyol 812, which are commercially available from Sasol.

Partial glycerides are monoglycerides, diglycerides and blends thereof, which may also contain small quantities of triglyceride. Suitable partial glycerides can have the general formula:

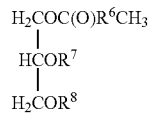

in which $R^6$, $R^7$ and $R^8$ independently represent a linear or branched, saturated and/or unsaturated residue with 6 to 22, for example, 12 to 18 carbon atoms or H with the proviso that at least one of the two residues $R^7$ and $R^8$ is H.

Suitable monoglycerides, diglycerides, or triglycerides include esters of caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselinic acid, linoleic acid, linolenic acid, eleostearic acid, arachic acid, gadoleic acid, behenic acid, erucic acid, or mixtures thereof. Suitable glycerides include lauric acid glycerides, palmitic acid glycerides, stearic acid glycerides, isostearic acid glycerides, oleic acid glycerides, behenic acid glycerides, erucic acid glycerides, or mixtures thereof and include those displaying a monoglyceride content in the from about 50 to about 95 wt-%, for example, about 60 to about 90 wt-%.

Suitable phospholipids include, for example, phosphatidic acids, real lecithins, cardiolipins, lysophospholipids, lysolecithins, plasmalogens, phosphosphingolipids, sphingomyelins. Suitable phospholipids include phosphatidylcholine, phosphatidylethanolamine, phosphatidylinositol, or N-acylphosphatidylethanolamine, or mixture thereof. Suitable phospholipids include lecithins. Types of lecithin include crude lecithins which have been deoiled, fractionated, spray-dried, acetylated, hydrolyzed, hydroxylated, or hydrogenated. They are available commercially. Suitable lecithins include soybean lecithins. As used herein, the general term "lecithin" includes phospholipids.

Phosphatidic acids are glycerol derivatives which have been esterified in the 1-sn- and 2-position with fatty acids (1-sn-position: mostly saturated, 2-position: mostly mono- or polyunsaturated), but on atom 3-sn with phosphoric acid. The phosphate radical can be esterified with an amino alcohol, such as choline (lecithin=3-sn-phophatidylcholine), 2-aminoethanol (ethanolamine), L-serine (cephalin=3-sn-phosphatidylethanolamine or sn-phosphatidyl-L-serine), with myoinositol to give the phosphoinositides [1-(3-sn-phosphatidyl)-D-myoinositols], with glycerol to give phosphatidyl glycerols.

Cardiolipins (1,3-bisphosphatidyl glycerols) are phospholipids of two phosphatidic acids linked via glycerol. Lysophospholipids are obtained when an acyl radical is cleaved off by a phospholipase A from phospholipids (e.g. lysolecithins). The phospholipids also include plasmalogens in which an aldehyde (in the form of an enol ether) is bonded in the 1-position instead of a fatty acid. Phosphosphingolipids are based on the basic structure of sphingosine or else phytosphingosine.

Suitable phospholides for use in the present compositions include those sold under the trade names Lipoid S 20 S, Lipoid S 75, Lipoid S 100, Lipoid S 100-3, Lipoid S 75-3N, Lipoid SL 80, and Lipoid SL 80-3, which are commercially available from Lipoid; Phospholipon 85 G, Phospholipon 80, Phospholipon 80 H, Phospholipon 90 G, Phospholipon 90 H, Phospholipon 90 NG, Phospholipon 100 H, Phosal 35B, Phosal 50G, Phosal 50SA, Phosal 53MCT, and Phosal 75SA, which are commercially available from Phospholipon, Cologne Germany; Alcolec Z-3 available from American Lecthin Company, Oxford Conn.; Emulfluid F30, Emulfluid, Lipotin NE, Lipotin 100, Lipotin SB, Lipotin 100J, Lipotin H, Lipotin NA, Lipotin AH, and Lipopur, which are commercially available from Cargill (Degussa Texturant Systems); Terradrill V 408 and Terradrill V 1075, which are commercially available from Cognis; Yellowthin 100, Yellowthin 200, Lecistar Sun 100, and Yellowthin Sun 200, which are commercially available from Sternchemie; and Lanchem PE-130K available from Lambent Technologies, Gurnee, Ill.

Suitable lipophilic compounds include: a partial fatty acid ester of glycerine; a partial or higher fatty acid ester of sorbitan; a fatty acid diester of a glycol or a poly(alkylene glycol) compound; a fatty acid ester of a polyol such as sucrose, pentaerythritol or dipentaerythritol; a methyl ester of a fatty acid; a fatty alcohol ester of benzoic acid; a fatty alcohol ester of phthalic acid or isophthalic acid; lanolin or a lanolin derivative; a fatty acid ester of trimethylol propane, or a mixture thereof.

Suitable partial esters of glycerine with linear or branched long chain (greater than about 8 carbon atoms) fatty acids include glycerol monooleate, glycerol monoricinoleate, glycerol monostearate, and glycerol monotallate (e.g. Lumulse GMO-K, Lumulse GMR-K, Lumulse GMS-K, and Lumulse GMT-K, available from Lambent Technologies, Gurnee Ill. and Tegin OV, available from Goldschmidt Chemical Corporation, Hopewell, Va.), or a mixture thereof. Suitable partial glycerides also include those sold under the tradenames Cutina EGMS, Cutina GMS-SE, Cutina GMS V, Cutina MD, or Cutina AGS, which are commercially available from Cognis.

Suitable partial and higher sorbitan esters, include for example, di- or tri-esters with linear or branched long chain (greater than about 8 carbon atoms) fatty acids, such as such as sorbitan tristearate, and sorbitan trioolate, and sorbitan sesquioleate (e.g., Lumisorb STS K, available from Lambent Technologies, Gurnee Ill., and Liposorb TO and Liposorb SQO, available from Lipo Chemicals, Paterson N.J.), or a mixture of these compounds.

Suitable diesters of glycol or poly(alkylene glycol) compounds with linear or branched long chain (greater than about 8 carbon atoms) fatty acids include neopentyl glycol dicaprylate/dicaprate and PEG-4 diheptanoate (e.g. Liponate NPCG-2 and Liponate 2-DH, available from Lipo Chemicals, Paterson N.J.).

Suitable fatty acid esters of polyols include polyol fatty acid polyesters, which term refers to a polyol that has two or more of its hydroxyl groups esterified with linear or branched long chain (greater than about 8 carbon atoms) fatty acid groups. For example, the polyol can be esterified with four or more fatty acid groups. Suitable polyol fatty acid polyesters include sucrose polyesters having on average at least four, e.g., at least about five, ester linkages per molecule of sucrose; the fatty acid chains can have from about eight to about twenty-four carbon atoms. Other suitable polyol fatty acid polyesters are esterified linked alkoxylated glycerins, including those including polyether glycol linking segments and those including polycarboxylate linking segments. Suitable polyols include aliphatic or aromatic compounds containing at least two free hydroxyl groups, and can include backbones such as saturated and unsaturated straight and branch chain linear aliphatics; saturated and unsaturated cyclic aliphatics, including heterocyclic aliphatics; or mononuclear or polynuclear aromatics, including heterocyclic aromatics. Polyols include carbohydrates and non-toxic glycols. Suitable fatty acid esters of sucrose include the soyate fatty acid ester of sucrose and the stearate fatty acid ester of sucrose (e.g. Sefose 1618S and Sefose 1618H, available from Proctor and Gamble Chemicals, Cincinnati Ohio). Suitable fatty acid esters of pentaerythritol and dipentaerythritol include pentaerythrityl tetracaprylate/tetracaprate and dipentaerythrityl hexacaprylate/hexacaprate (e.g. Liponate PE-810 and Liponate DPC-6 available from Lipo Chemicals, Paterson N.J.).

Suitable methyl esters of fatty acids include methyl palmitate and methyl stearate (e.g. CE-1695 and CE-1897, available from Proctor and Gamble Chemicals, Cincinnati Ohio).

Suitable fatty alcohol esters of benzoic acid include C12-C15 alkyl benzoate (e.g. Liponate NEB, available from Lipo Chemicals, Paterson N.J.).

Suitable fatty alcohol esters of phthalic acid or isophthalic acid include dioctyl phthalate.

Suitable fatty alcohol esters of trimellitic acid include tridecyl trimellitate (e.g. Liponate TDTM, available from Lipo Chemicals, Paterson N.J.).

Suitable lanolins and lanolin derivatives include hydrogentated lanolin and lanolin alcohol (e.g Technical Grade Lanolin, Ritawax, and Supersat available from Rita Corporation, Crystal Lake Ill.).

Suitable fatty acid esters of trimethylol propane include trimethylol propane trioleate and trimethylol propane tricaprate/caprylate (e.g. Synative ES 2964 available from Cognis and Priolube 3970 available from Uniqema New Castle, Del.).

In an embodiment, the lipophilic compound is or includes mineral oil.

In an embodiment, the lipophilic compound is or includes a long chain (greater than about 8 carbon atoms) fatty acid compound including a fatty acid derived from the saponification of vegetable or animal fat or an oil such as tall oil fatty acid, coconut fatty acid, oleic acid, ricinoleic acid, or carboxylic acid terminated short chain polymers of hydroxyl functional fatty acids such as ricinoleic acid and salts thereof (e.g. Hostagliss L4 available from Clariant Corporation, Mount Holly N.J.), or a mixture of these compounds. Suitable fatty acid lipophilic compounds include caproic acid, lauric acid, myristic acid, oleic acid, stearic acid (e.g. C-698, C-1299, C-1495, OL-800 and V-1890, available from Proctor and Gamble Chemicals, Cincinnati Ohio), or a mixture thereof.

Exemplified lipophilic compounds include tri(caprate/caprylate) ester of glycerine; caprylate, caprate, cocoate triglyceride; soyate fatty acid ester of sucrose; diheptanoate ester of poly(ethylene glycol); and trimethylol propane trioleate.

The Anionic Surfactant

The present composition can include any of a variety of anionic surfactants that are effective to increase the ability of the lipophilic emulsion to withstand application of water to the conveyor. Suitable anionic surfactants include phosphate esters and carboxylic acids.

Phosphate esters have the acid —OH groups in a phosphoric acid moiety covalently bonded to a hydroxyl group of an alcohol moiety. Since orthophosphoric acid has three —OH groups, it can form an ester with one, two, or three alcohol molecules to form a mono-, di-, or triester. Phosphate esters including as the alcohol moiety an amine or quaternary ammonium functional alcohols are zwitterionic compounds that can be employed as the anionic surfactant in the composition present invention. Such phosphate esters include phosphatidyl ethanolamine compounds and phosphatidyl choline compounds. Lecithin is a well known emulsifier composed primarily of phosphatidyl choline compounds. These phosphate esters with no net charge are useful in the present invention. Other phosphorus containing compounds that can be used in the present compositions include acid phosphates, phosphonates, phosphate esters of ethoxylated long chain alcohols, and phosphate esters of ethoxylated alkyl phenol compounds.

Suitable carboxylic acid surfactants include long chain carboxylic acid compounds. Long chain carboxylic acid compounds include fatty acids derived from the saponification of vegetable and animal fats, carboxylic acid terminated short chain polymers of hydroxy functional fatty acids such as ricinoleic acid, ethoxylated fatty acids, and other derivatives of fatty acids. Carboxylic acid surfactants with no net charge are useful in the present invention. For example, long chain carboxylic acid compounds are useful at a pH at which the carboxyl group is almost completely or completely protonated (not ionized).

Anionic surfactants useful in the present invention include:

(1) phospholipid compounds such as lecithin, hydroxylated lecithin, and phosphate ester derivatives of mono- and di-esters of glycerine with linear or branched long chain (greater than about 8 carbon atoms) fatty acids and salts thereof (e.g. Phospholipon 80 and Alcolec Z-3 available from American Lecithin Company, Oxford Conn. or Phospholipid, Cologne Germay and Lanchem PE-130K available from Lambent Technologies, Gurnee Ill.), or a mixture of these surfactants;

(2) phosphate ester compounds formed from esterification of phosphoric acid with linear or branched long chain (greater than about 8 carbon atoms) fatty alcohols, alcohol ethoxylates, alcohol propoxylates, alcohol ethoxylate propoxylates and ethoxylated linear and branched alkylphenol compounds and salts thereof such as poly(ethylene oxide) oleyl ether phosphate and a poly(ethylene oxide) C8-C10 alkyl ether phosphate (e.g. Rhodafac PA/32, Rhodafac PA/35, and Rhodafac RA-600, available from Rhodia, Cranbury N.J.), or a mixture of these surfactants;

(3) long chain (greater than about 8 carbon atoms) fatty acid compounds including fatty acids derived from the saponification of vegetable and animal fats and oils such as tall oil fatty acid, coconut fatty acid, oleic acid, ricinoleic acid, and carboxylic acid terminated short chain (e.g., n=4) polymers of hydroxyl functional fatty acids such as ricinoleic acid and salts thereof (e.g. Hostagliss L4 available from Clariant Corporation, Mount Holly N.J.), or a mixture of these surfactants;

(4) long chain (greater than about 8 carbon atoms) alkyl sulfonate and sulfate compounds such as octanesulfonic acid, sulfuric acid ester with lauryl alcohol, sulfuric acid ester with lauryl alcohol and salts thereof (e.g. Texapon K-12G and Texapon K-14S available from Cognis North America, Cincinnati Ohio), or a mixture of these surfactants;

(5) sulfonated succinic acid esters with long chain (greater than about 8 carbon atoms) alcohols and ethoxylated long chain alcohols such as the bis(2-ethylhexyl) ester of sulfosuccinic acid and the lauryl poly(ethylene oxide) ester of sulfosuccinic acid (e.g. Aerosol OT, available from Cytec Industries, Inc. Paterson N.J. and Texapon SB 3KC available from Cognis North America, Cincinnati Ohio), or a mixture of these surfactants;

(6) sulfuric acid esters of linear or branched long chain (greater than about 8 carbon atoms) alcohol ethoxylates, alcohol propoxylates, alcohol ethoxylate propoxylates and ethoxylated linear and branched alkylphenol compounds and salts thereof such as sodium dodecylpoly(oxyethylene) sulfate (e.g., Texapon N70 available from Cognis North America, Cincinnati Ohio), or a mixture of these surfactants;

(7) sulfonates of benzene, cumene, toluene and alkyl substituted aromatic compounds and salts thereof such as sodium alkyl benzene sulfonic acid (e.g. Nansa HS90/S, available from Huntsman Chemical Corporation, The Woodlands Tex.), or a mixture of these surfactants;

(8) carboxylates of alcohol ethoxylates, alcohol propoxylates, alcohol ethoxylate propoxylates and ethoxylated linear and branched alkylphenol compounds and salts thereof such as poly(ethylene oxide) tridecyl alcohol ether carboxylic acid and sodium poly(ethylene oxide) lauryl ether carboxylate (e.g. Emulsogen DTC Acid and Emulsogen LS-24N from Clariant Corporation, Mount Holly N.J.), or a mixture of these surfactants;

(9) mono- and di-esters of glycerine with linear or branched long chain (greater than about 8 carbon atoms) fatty acid compounds further esterified with short chain di- and poly-carboxylic acid compounds, such as glycerol monostearate monocitrate (e.g. Grindsted Citrem 2-in-1 available from Danisco, Copenhagen Denmark), and mixtures of these surfactants; (10) long chain (greater than about 8 carbon atoms) acyl amino acids, such as acyl glutamates, acyl peptides, acyl sarcosinates, acyl taurates, salts thereof, and mixtures of these surfactants;

(11) a mixture of such surfactants.

Exemplified anionic surfactants include oleyl-5EO-phosphate ester, short chain homopolymer of ricinoleic, and oleic acid.

Although not limiting to the present invention, it is believed that the anionic surfactant is effective to improve the stability and decrease the particle size of oil in water emulsions.

Emulsifier

Useful emulsifiers for preparing lipophilic emulsions include nonionic surfactants. Suitable nonionic surfactants include:

(1) mono- and di-esters of glycerine with linear or branched long chain (greater than about 8 carbon atoms) fatty acids, such as glycerol monooleate, glycerol monoricinoleate, glycerol monostearate, and glycerol monotallate (e.g. Lumulse GMO-K, Lumulse GMR-K, Lumulse GMS-K, and Lumulse GMT-K, available from Lambent Technologies, Gurnee Ill. and Tegin OV, available from Goldschmidt Chemical Corporation, Hopewell, Va.), or a mixture of these surfactants;

(2) polyglyceryl monoesters with linear or branched long chain (greater than about 8 carbon atoms) fatty acids such as triglycerol monooleate (e.g. Lumulse PGO-K, available from Lambent Technologies, Gurnee Ill.), or a mixture of these surfactants;

(3) ethoxylated mono- and di-esters of glycerine with linear or branched long chain (greater than about 8 carbon atoms) fatty acids such as poly(oxyethylene) glyceryl monolaurate (e.g. Lumulse POE(7) GML and Lumulse POE(20) GMS-K, available from Lambent Technologies, Gurnee Ill.), or a mixture of these surfactants;

(4) sorbitan esters with linear or branched long chain (greater than about 8 carbon atoms) fatty acids such as sorbitan monolaurate, sorbitan monopalmitate, sorbitan monostearate, and sorbitan monooleate (e.g., SPAN series 20, 40, 60, and 80, available from Uniqema, New Castle, Del. and Lumisorb SMO, available from Lambent Technologies, Gurnee Ill.), or a mixture of these surfactants;

(5) ethoxylated sorbitan esters with linear or branched long chain (greater than about 8 carbon atoms) fatty acids such as polyoxyethylene (20) sorbitan monolaurate (polysorbate 20), polyoxyethylene (20) sorbitan monopalmitate (polysorbate 40), polyoxyethylene (20) sorbitan monostearate (polysorbate 60), and polyoxyethylene (20) sorbitan monooleate (polysorbate 80) (e.g., TWEEN series 20, 40, 60, and 80, available from Uniqema, New Castle, Del.), or a mixture of these surfactants;

(6) ethoxylated castor oils such as PEG-5 castor oil, PEG-25 castor oil, and PEG-40 castor oil (e.g. Lumulse CO-5, Lumulse CO-25, and Lumulse CO-40 available from Lambent Technologies, Gurnee Ill.), or a mixture of these surfactants;

(7) mono- and di-esters of ethylene glycol and poly(ethylene glycol) with linear or branched long chain (greater than about 8 carbon atoms) fatty acids such as ethylene glycol distearate, PEG-400 monooleate, PEG-400 monolaurate, PEG-400 dilaurate, and PEG-4 diheptanoate (e.g. Lipo EGDS available from Lipo Chemicals, Paterson N.J., Lumulse 40-OK, Lumulse 40-L, and Lumulse 42-L available from Lambent Technologies, Gurnee Ill. and LIPONATE 2-DH, product of Lipo Chemicals, Inc., Paterson N.J.), or a mixture of these surfactants;

(8) EO-PO block copolymers such as poly(ethylene oxide)-poly(propylene oxide)-poly(ethylene oxide) block copolymers and poly(propylene oxide)-poly(ethylene oxide)-poly(propylene oxide) block copolymers (e.g. Pluronic and Pluronic R series products available from BASF Corporation, Florham Park N.J.), or a mixture of these surfactants;

(9) alcohol ethoxylates, alcohol propoxylates, and alcohol ethoxylate propoxylates formed from the addition of ethylene oxide and/or propylene oxide to linear or branched long chain (C8 or greater) fatty alcohols such as poly(ethylene oxide) undecyl ether, poly(ethylene oxide) ether with (C12-C15) linear primary alcohols, poly(ethylene oxide) ether with (C14-C15) linear primary alcohols, and ethoxylated propoxylated C8-10 alcohols (e.g. Tomadol 1-3 alcohol ethoxylate, Tomadol 25-7 alcohol ethoxylate, and Tomadol 45-7 alcohol ethoxylate available from Air Products, Inc., Allentown Pa.; and Antarox BL-214 available from Rhodia, Cranbury N.J.), or a mixture of these surfactants;

(10) alcohol ethoxylates formed from the addition of ethylene oxide to linear and branched alkylphenol compounds such as poly(ethylene oxide) ether with nonyl phenol (e.g. Surfonic N95, available from Huntsman Chemical Corporation, The Woodlands Tex.), or a mixture of these surfactants;

(11) alkylated mono-, di- and oligoglycosides containing 8 to 22 carbon atoms in the alkyl group and ethoxylated alkylated mono-, di- and oligoglycosides containing 8 to 22 carbon atoms in the alkyl group such as poly(D-glucopyranose) ether with (C8-C14) linear primary alcohols (e.g. Glucopon 425N/HH, available from Cognis North America, Cincinnati Ohio), or a mixture of these surfactants;

(12) amide compounds formed from linear or branched long chain (greater than about 8 carbon atoms) fatty acids such as coconut acid diethanolamide and oleic acid diethanolamide (e.g. Ninol 40-CO and Ninol 201, available from Stepan Corporation, Northfield Ill. and Hostacor DT, available from Clariant Corporation, Mount Holly, N.C.), or a mixture of these surfactants;

(13) ethoxylate compounds formed from the addition of ethylene oxide to amide compounds formed from linear or branched long chain (greater than about 8 carbon atoms) fatty acids such as poly(ethylene oxide) ether with coconut acid ethanolamide (e.g. Ninol C-5 available from Stepan Corporation, Northfield Ill.), or a mixture of these surfactants;

(14) nonionic silicone surfactants such as poly(ethylene oxide) ether with methyl bis(trimethylsilyloxy) silyl propanol (e.g. Silwet L77 available from Momentive Performance Materials, Wilton N.J.), or a mixture of these surfactants

(15) trialkyl phosphates, or a mixture of trialkyl phosphates;

(16) mono- and di-esters of glycerine with linear or branched long chain (greater than about 8 carbon atoms) fatty acids further esterified with short chain monocarboxylic acids, such as such as glycerol monostearate lactate (e.g. Grindsted Lactem P22, available from Danisco, Copenhagen Denmark), or a mixture of these surfactants; or

(17) a mixture of such surfactants.

Exemplified emulsifiers include lecithin, ethoxysorbitan monostearate, glycerol monooleate, and 20 mole ethoxylated castor oil.

More about Emulsions and Emulsifiers

When dispersing oils or hydrophobic materials, formulators have found that emulsification systems made up of two or more emulsifiers tend to give better dispersion properties, for example more stable dispersions, than a single emulsifier. When formulating emulsions with two or more emulsifiers, it is typical to use emulsifiers with different HLB values, and to adjust the ratio of emulsifiers to achieve a composite HLB value that is most suitable for emulsifying the hydrophobic material. In the case that two or more emulsifiers with different HLB values are used, it may be the case that emulsifiers with low HLB values are insoluble in water and themselves meet the definition of lipophilic compounds as described above. Therefore some compounds included in a list of lipophilic compounds useful in the present invention will also be included in a list of emulsifiers useful in the present invention.

Although the terms colloid and emulsion are sometimes used interchangeably, emulsion tends to imply that both the dispersed and the continuous phase are liquid. A commonly referred to example of an emulsion is milk, in which most of the milk lipid is in the form of globules ranging in size from 0.1 to 15 um in diameter. In the context of the present invention, by emulsion it is meant a colloidal system in which the dispersed phase is a liquid, a semi-solid, or a low melting solid with a melting point less than about 100° C. and wherein the lipophilic compound is dispersed in and remains separate from a liquid continuous phase which may be water, an aqueous solution, or another polar liquid in which the lipophilic compound is insoluble, and wherein the particle size of the dispersed phase ranges between about 10 angstroms and 15 microns. Emulsions of the present invention will be characterized by one or more of the following: is opaque or translucent, exhibits a Tyndall effect, and/or contains dispersed material that will not pass through a membrane.

An emulsifier is a substance which stabilizes an emulsion. Typically emulsifiers are amphipathic surface active compounds which possess both hydrophilic and hydrophobic moieties. The ratio of hydrophilic and hydrophobic moieties in a surfactant is commonly expressed as the hydrophilic-lipophilic balance or HLB. In the preparation of emulsions, it may be desirable to use more than one emulsifying compound in which case the emulsifier present in the greatest concentration may be referred to as the primary emulsifier and emulsifiers present in lower concentrations may be referred to as co-emulsifiers or secondary emulsifiers, or all of the emulsifiers present in a composition may be referred to as co-emulsifiers.

Emulsions are unstable and thus do not form spontaneously. There are two prevalent methods for formation of colloidal dispersions including emulsions which are generation of the dispersed phase in situ and introduction of the dispersed phase into the continuous phase with energy in processes including heating, shaking, stirring, high shear mixing, and microfluidization. Emulsions of the present invention can be prepared by introduction of the dispersed phase into the continuous phase.

Over time, emulsions tend to revert to the stable state of oil separated from water, a process which is retarded by emulsifiers. It is understood that in the context of the present invention that "stable emulsion" does not refer only to systems that are thermodynamically stable, but also includes systems in which the kinetics of decomposition have been greatly slowed, that is, metastable systems. Emulsions can decompose through processes of flocculation (aggregation of dispersed particles), creaming (migration of the dispersed particles to the top of the emulsion due to buoyancy), and coalescence (combination of dispersed droplets to form larger ones).

In certain embodiments, a stable emulsion according to the present invention does not physically phase separate, exhibit creaming or coalescence, or form precipitate. In an embodiment, the emulsion is sufficiently stable that it is stable under conditions at which a conveyor lubricant composition is stored and shipped. For example, in an embodiment, the present stable emulsion does not phase separate in one month at 4 to 50° C., or even in two months or three months at such temperatures.

Dialysis presents simple test for insolubility of a lipophilic compound. A lipophilic compound can be considered insoluble if when dialyzed through a membrane with a molecular weight cut off of 1,000, the lipophilic compound is retained in the interior of the dialysis tubing.

Because the densities of lipophilic compounds are often greatly different than that of water, stabilization of fluid emulsions is favored by small particle sizes. Small particle size oil in water emulsions can be provided by the use of high shear processes, by the use of co-solvents, or they may be provided by certain compositions and concentrations of lipophilic oils with emulsifiers/and or anionic surfactants and water, or both co-solvents and high shear processes. For example, in the absence of high shear processing, addition of a mixture of lipophilic oil plus emulsifiers to stirring water plus hexylene glycol solution may give a stable emulsion with a small particle size whereas addition of the same mixture of oil and emulsifiers to water alone will not. Emulsions of the present invention can have volume average particle sizes less than about 10 microns, e.g., less than about 3 microns, such as less than about 1 micron. For ease of application by spraying, an emulsion of the present composition can have a viscosity of about 40 cP or less.

Additional Components

The lubricant compositions can contain additional components if desired. For example, the compositions can contain adjuvants such as conventional waterborne conveyor lubricants (e.g., fatty amine based lubricants), antimicrobial agents, colorants, foam inhibitors or foam generators, cracking inhibitors (e.g., PET stress cracking inhibitors), viscosity modifiers, film forming materials, surfactants, antioxidants, antistatic agents, corrosion inhibitors and mixtures thereof. Examples of suitable amine or amine derivative lubricants include oleyl diamino propane, coco diamino propane, lauryl propyl diamine, dimethyl lauryl amine, PEG coco amine, alkyl $C_{12}$-$C_{14}$ oxy propyl diamine, and those amine compositions described in U.S. Pat. Nos. 5,182,035 and 5,932,526, both of which are incorporated by reference herein in this disclosure. The amounts and types of such additional components will be apparent to those skilled in the art.

For applications involving plastic containers, the lubricant compositions can have a total alkalinity equivalent to less than about 100 ppm $CaCO_3$, e.g., less than about 50 ppm $CaCO_3$, such as less than about 30 ppm $CaCO_3$, as measured in accordance with Standard Methods for the Examination of Water and Wastewater, $18^{th}$ Edition, Section 2320, Alkalinity.

For applications involving plastic containers, it can be advantageous to avoid the use of components in the formula that might promote environmental stress cracking in plastic containers. Ingredients that can inhibit stress cracking include those described in assignee's patent U.S. Pat. No. 7,915,206, titled SILICONE LUBRICANT WITH GOOD WETTING ON PET SURFACES, filed on Sep. 22, 2005, examples described in assignee's patent U.S. Pat. No. 7,727,941 titled SILICONE CONVEYOR LUBRICANT WITH STOICHIOMETRIC AMOUNT OF AN ACID, filed Sep. 22, 2005, and in assignee's patent U.S. Pat. No. 7,741,255 entitled AQUEOUS COMPOSITIONS USEFUL IN FILLING AND CONVEYING OF BEVERAGE BOTTLES WHEREIN THE COMPOSITIONS COMPRISE HARDNESS IONS AND HAVE IMPROVED COMPATIBILITY WITH PET, filed Jun. 23, 2006. Each of these patents is incorporated herein by reference for disclosure of these components. The stress cracking inhibitor, if present, can be selected to be compatible with the other ingredients of the lubricant composition.

Methods of Using the Present Lubricants

The present invention provides in one aspect, a method for lubricating the passage of a container along a conveyor including applying a lipophilic emulsion or a mixture of a lipophilic emulsion material and a water-miscible lubricant to at least a portion of the container contacting surface of the conveyor or to at least a portion of the conveyor contacting surface of the container. In some embodiments, the present invention is directed to a method of applying an undiluted lubricant intermittently. The composition can be applied while the conveyor is at rest or while it is moving, e.g., at the conveyor's normal operating speed.

The lubricant coating can be applied in a constant or intermittent fashion. The lubricant coating can be applied in an intermittent fashion in order to minimize the amount of applied lubricant composition. It has been discovered that the present invention may be applied intermittently and maintain a low coefficient of friction in between applications, or avoid a condition known as "drying". Specifically, the present invention may be applied for a period of time and then not applied for at least 15 minutes, at least 30 minutes, or at least 120 minutes or longer. The application period may be long enough to spread the composition over the conveyor belt (i.e. one revolution of the conveyor belt). During the application period, the actual application may be continuous, i.e. lubricant is applied to the entire conveyor, or intermittent, i.e. lubricant is applied in bands and the containers spread the lubricant around. The lubricant can be applied to the conveyor surface at a location that is not populated by packages or containers. For example, the lubricant spray can be applied upstream of the package or container flow or on the inverted conveyor surface moving underneath and upstream of the container or package.

In some embodiments, the ratio of application time to non-application time may be 1:10, 1:30, 1:180, or 1:500 where the lubricant maintains a low coefficient of friction in between lubricant applications. Put another way, in an embodiment, applying includes applying the lubricant composition for a first length of time and not applying it for a second length of time. The ratio of the first length to the second length can be about 1 to greater than or equal to about 100. The ratio of the first length to the second length can be about 1 to greater than or equal to about 10, about 1 to greater than or equal to about 30, about 1 to greater than or equal to about 180, or about 1 to greater than or equal to about 500.

In some embodiments, the lubricant maintains a coefficient of friction below about 0.4, below about 0.2, below about 0.15, or below about 0.12.

In some embodiments, a feedback loop may be used to determine when the coefficient of friction reaches an unacceptably high level. The feedback loop may trigger the lubricant composition to turn on for a period of time and then optionally turn the lubricant composition off when the coefficient of friction returns to an acceptable level.

In an embodiment, the present method includes a method of cleaning a conveyor. This embodiment can include applying the present lipophilic lubricant composition to the conveyor, conveying containers, washing or rinsing the conveyor and removing soil, and, after washing and removing soil, continuing to convey containers on the conveyor with an acceptable coefficient of friction between the container and the conveyor. That is, the coefficient of friction remains at a level at which the conveyor can continue conveying containers for a significant time without another or an unscheduled application of lubricant to the conveyor. The coefficient of friction can remain below, for example, 0.4 according to the short track test described below. Washing or rinsing the conveyor can occur while the conveyor continues to operate, i.e. while containers are conveyed. Washing or rinsing can employ diluted lubricant composition.

The method can include conveying containers until the container or the conveyor (e.g., a link on the conveyor) are unacceptably soiled. In an embodiment, unacceptably soiled refers to a level of soil such that when package that has been conveyed is placed on a white surface such as cloth or paper, an unacceptably visible mark is left. In an embodiment, unacceptably soiled refers to the conveyor surface having an unacceptably soiled appearance, or both. In an embodiment, unacceptably soiled refers to a level of soil such that when package that has been conveyed is placed on a white surface such as cloth or paper, an unacceptably visible mark is left and the conveyor surface having an unacceptably soiled appearance, or both. In the case of production lines which include stainless steel conveyors, the extent of soiling may be measured in terms of weight of iron present as soil per container or per conveyor belt chain link. For example the iron containing soil may be analyzed by wiping the package or the chain link with a paper tissue and then quantifying iron present by digestion and spectroscopy such as inductively coupled plasma spectroscopy. Acceptable levels of soil for bottles may be less than 100 μg iron/bottle, less than 50 μg iron/bottle, or less than 25 μg iron/bottle. Acceptable levels of soil for conveyor belt chain links may be less than 50 μg iron/square inch of link surface, less than 25 μg iron/square inch of link surface, or less than 12.5 μg iron/square inch of link surface.

The lubricant coating thickness can be maintained generally at the interface at greater than or equal to about 0.0001 mm, e.g., about 0.001 to about 2 mm, and such as about 0.005 to about 0.5 mm.

Application of the lubricant composition can be carried out using any suitable technique including spraying, wiping, brushing, drip coating, roll coating, and other methods for application of a thin film.

A variety of kinds of conveyors and conveyor parts can be coated with the lubricant composition. Parts of the conveyor that support or guide or move the containers and can be coated with the lubricant composition include belts, chains, gates, chutes, sensors, and ramps having surfaces made of fabrics, metals, plastics, composites, or combinations of these materials. The lubricant can reside or be deliberately applied so as to reside between the conveyor belt chain and conveyor belt chain support such as a wear strip. For example, a nozzle may be placed underneath the conveyor belt table top with a spray directed at the underside of the conveyor belt chain link, or a nozzle may be placed with a spray directed towards the wear strip at a location where it is accessible through or underneath the conveyor belt chain.

The lubricant composition can also be applied to a wide variety of containers including beverage containers; food containers; household or commercial cleaning product containers; and containers for oils, antifreeze or other industrial fluids. The containers can be made of a wide variety of materials including glasses; plastics (e.g., polyolefins such as polyethylene and polypropylene; polystyrenes; polyesters such as PET and polyethylene naphthalate (PEN); polyamides, polycarbonates; and mixtures or copolymers thereof); metals (e.g., aluminum, tin or steel); papers (e.g., untreated, treated, waxed or other coated papers); ceramics; and laminates or composites of two or more of these materials (e.g., laminates of PET, PEN or mixtures thereof with another plastic material). The present invention is especially suited for glass containers. The containers can have a variety of sizes and forms, including cartons (e.g., waxed cartons or TETRAPACK™ boxes), cans, bottles and the like. Although any desired portion of the container can be coated with the lubricant composition, the lubricant composition can be applied only to parts of the container that will come into contact with the conveyor or with other containers. In an embodiment, the lubricant composition is not applied to portions of thermoplastic containers that are prone to stress cracking. In an embodiment, the lubricant composition is applied to the crystalline foot portion of a blow-molded, footed PET container (or to one or more portions of a conveyor that will contact such foot portion) without applying significant quantities of lubricant composition to the amorphous center base portion of the container. Also, in certain embodiments, the lubricant composition is not applied to portions of a container that might later be gripped by a user holding the container, or, if so applied, is removed from such portion prior to shipment and sale of the container. For some such applications, the lubricant composition is applied to the conveyor rather than to the container, which can limit the extent to which the container might later become slippery in actual use.

In an embodiment, the present method includes a method for lubricating the passage of a container along a conveyor. This method can include applying an undiluted lubricant composition to at least a portion of a container-contacting surface of the conveyor or to at least a portion of a conveyor-contacting surface of the container. This method can employ a lubricant composition including about 0.1 about 30 wt-% lipophilic compound; about 0.05 about 15 wt-% emulsifier, anionic surfactant, or mixture thereof; and about 55 to about 97 wt-% water. In an embodiment, the method can employ about 1 to about 50 wt-% lipophilic compound. In an embodiment, the method can employ about 3 to about 40 wt-% lipophilic compound.

Dispensing Equipment

Dispensing equipment for practice of the present invention includes spraying apparatus that comprises spray nozzles that are non-energized, i.e. they provide a fine lubricant spray at relatively low flow rates (less than about 10 mL/sec at pressures less than about 50 psi) without requiring applied energy (for example high pressure, compressed air, or sonication) to break up the lubricant flow into small droplets. The spray dispensing system operates at relatively lower pressure (less than about 50 psi) and does not comprise either a high pressure lubricant line or a lubricant venting line. Useful droplet sizes for the lubricant spray are from about 100 to about 5000 microns, e.g., about 100 to about 500 microns.

Suitable nozzles for the practice of the current invention are small capacity spray nozzles which distribute the liquid lubricant as a solid (full) cone, hollow cone, flat fan or sheet-type of spray at pressures less than about 50 psi. In an embodiment, the nozzles are flat spray nozzles with tapering edges which are useful in establishing uniform spray distribution from overlapping spray patterns between adjacent sprays on a multiple nozzle header. Flat spray nozzles useful in the practice of the current invention include elliptical orifice nozzles and deflector nozzles. In the elliptical orifice design, the axis of the spray pattern is a continuation of the axis of the inlet pipe connection. In the deflector design, the deflection surface diverts the spray pattern away from the axis of the inlet pipe connection. Useful flat spray nozzles include FloodJet and VeeJet Small Capacity Wide Spray Angle nozzles (available from Spraying Systems, Wheaton, Ill.), FF Extra Wide Angle and NF Standard Fan nozzles (available from Bete Fog Nozzle, Inc., Greenfield, Mass.), and Flat Spray Standard nozzles (available from Allspray, Inc., Carol Stream, Ill.). A suitable deflector flat spray nozzle is the Low Flow FloodJet 1/8K-SS.25 nozzle available from Spraying Systems, Wheaton Ill. Useful cone spray nozzles include UniJet Small Capacity Standard Spray nozzles (available from Spraying Systems, Wheaton, Ill.), WT Right Angle Hollow Cone nozzles (available from Bete Fog Nozzle, Inc., Greenfield, Mass.), and Hollow Cone Standard nozzles (available from Allspray, Inc., Carol Stream, Ill.). A suitable cone spray nozzle is the UniJetTXVS-1 nozzle available from Spraying Systems, Wheaton Ill.

Dispensing apparatus for practice of the present invention includes means to provide lubricant compositions to nozzles under low to moderate pressures, less than about 50 psi.

One possible means is to pressurize the lubricant source. Suitable dispensing equipment includes means to pressurize the lubricant composition in line by pumping. The requirements for a pump are modest and can be met by a variety of pump designs including diaphragm pumps, peristaltic pumps, and valveless rotating reciprocating piston metering pumps. Suitable pumps start and stop automatically when a discharge valve downstream of the pump is opened and closed. In this way, the pump is not operating during non-application periods. Examples of pumps that start and stops automatically include positive displacement diaphragm pumps with built-in pressure switches that automatically start and stop pump instantaneously when discharge valve is opened, for example a Flowjet 2100 pump available from Flowjet, a division of IIT Industries, Foothill Ranch, Calif. Other examples of pumps that start and stop automatically are positive displacement reciprocating double diaphragm pumps such as the Wilden PI plastic pump available from Wilden Pump & Engineering, LLC, Grand Terrace, Calif. and pneumatic single diaphragm pumps such as the Yamada NDP-5 pump available from Yamada America, West Chicago Ill. Pumps which do not automatically start and stop upon action of a downstream discharge valve may advantageously be used with a controller that actuates both the downstream discharge valve and the pump.

Methods of Making the Present Composition

High shear processes useful in the preparation of stable, small particle size emulsions include rotor-stator homogenizers, blade type homogenizers (blenders), and high pressure homogenizers (also known as microfluidizers or dairy homogenizers). In high pressure homogenizers, liquid is forced under high pressure through a narrow orifice which generates high shear. Variations of high pressure homogenization include impingement microfluidization in which two streams of liquid collide after being forced through opposing orifices, and impact ring microfluidization in which the stream of liquid impacts a flat surface surrounded by a ring.

The present invention may be better understood with reference to the following examples. These examples are intended to be representative of specific embodiments of the invention, and are not intended as limiting the scope of the invention.

EXAMPLES

Test Methods

Short Track Conveyor Test

Conveyor systems employing a motor-driven 6½ inch wide stainless steel belts were operated at belt speeds of between about 120 feet/minute and 170 feet/minute. The length of the conveyor system was ten feet with stainless steel conveyor belts approximately 22 feet in length. The belts included a dual track arrangement of two 3¼ inch wide 815 speed line straight running chains and a single track of 6½ inch wide 815 speed line straight running chains (815 speed line chains are both products of Solus Industrial Innovations, LLC, Rancho Santa Magarita, Calif.). Before testing lubrication properties of sample formulations, the conveyor system was scrubbed using nylon brushes and ScotchBrite® pads using a cleaning solution consisting of 2.5% sodium metasilicate, 1.0% sodium hydroxide, 1.0% Tomadol 1-3, and 0.5% Tomadol 25-7 (Tomadol products available from Air Products, Allentown Pa.).

Two 12 ounce filled glass bottles were lassoed and connected to a stationary strain gauge. The force exerted on the strain gauge during belt operation was recorded continuously every 2 to 3 seconds during operation using a computer. Lubricant compositions were applied to the surface of the belt using conventional lubricant spray nozzles operating at 36 psi to 44 psi and delivering lubricant at 60 mL/min to 80 mL/min. The period of initial lubricant application was 87 seconds. After the initial application of lubricant, the belt was allowed to run for eighty minutes without application of additional lubricant while the force exerted on the strain gauge was recorded.

To test for water resistance of lubricated belts, water was applied to the conveyor using a second nozzle operating at 36 psi to 44 psi and delivering water at 100 mL/min to 120 mL/min forty minutes after the start of the experiment and continuing for the duration of the experiment while the force exerted on the strain gauge continued to be recorded.

The coefficient of friction (COF) was calculated by dividing the drag force (F) by the weight of the two 12 ounce filled glass bottles plus the lasso (W): COF=F/W. In the examples below, reported COF values are the average recorded COF values collected over a one minute period.

Lubricity Test

Certain tests reported in Example 1 used a laboratory test conveyor to test the lubricity of a lubricant composition. The lubricity test was done by measuring the drag force (frictional force) of a weighted beverage container package standing on a running conveyor belt, wetted by the test sample. The beverage containers were made of glass, PET, metal, or carton. The conveyor chain material was made of stainless steel or delrin (polyacetal or plastic). The belt has a width of 8.2 cm and a length of approximately 7.5 m and an average speed of 1.2 m/s. The drag force, using an average value, was measured with a force gauge, which was connected to the container package by a thin monofilament fishing line. The drag force was monitored with a computer, connected directly to the force gauge. The coefficient of friction (COF) was calculated by dividing the drag force (F) by the weight of the cylinder package (W): COF=F/W.

In this test, the test sample was sprayed on the moving conveyor belt surface for 36 seconds with a hand sprayer. The hand sprayer sprays an amount of 16 g test sample on the conveyor belt in 36 seconds. The drag force was monitored for 30 minutes without replenishing the test sample. After 30 minutes, 250 millilitres of pure water were poured on the belt to test the compatibility of the test sample with water spillage.

Embodiments of the Method and Composition

In an embodiment, the present invention relates to a method for lubricating the passage of a container along a conveyor. This embodiment can include applying a lubricant composition to at least a portion of a container-contacting surface of the conveyor or to at least a portion of a conveyor-contacting surface of the container; the lubricant composition including: about 3 about 40 wt-% lipophilic compound; about 0.05 about 15 wt-% emulsifier, anionic surfactant, or mixture thereof; and about 55 to about 97 wt-% water.

In an embodiment of the method, the lipophilic compound includes tri(caprate/caprylate) ester of glycerine; caprylate, caprate, cocoate triglyceride; soyate fatty acid ester of sucrose; diheptanoate ester of poly(ethylene glycol); or trimethylol propane trioleate. In an embodiment of the method, the emulsifier includes ethoxysorbitan monostearate, glycerol monooleate, 20 mole ethoxylated castor oil, or mixture thereof. In an embodiment of the method, the anionic surfactant includes lecithin, oleyl-5EO-phosphate ester, short chain homopolymer of ricinoleic, glycerol monostearate monocitrate, or oleic acid. In an embodiment of the method, the composition further includes an additional functional ingredient. In an embodiment of the method, the additional functional ingredient includes antimicrobial agent, cracking inhibitor, antioxidant, or mixture thereof. In an embodiment of the method, the emulsifier includes lecithin, citric acid ester, or mixture thereof. In an embodiment of the method, the composition further includes a co-emulsifier including polyol, polyalkylene glycol, linear copolymer of ethylene and propylene oxides, sorbitan ester, fatty acid and their derivatives, or mixture thereof. In an embodiment of the method, the lipophilic compound includes triglyceride.

In an embodiment of the method, applying includes spraying the composition through a non-energized nozzle. In an embodiment of the method, applying includes applying the lubricant composition for a first length of time and not applying it for a second length of time; wherein the ratio of the first length to the second length is about 1 to greater than or equal to about 10.

In an embodiment of the method, the composition maintains a coefficient of friction of less than about 0.4 over the entire period of use.

In an embodiment of the method, the container includes polyethylene terephthalate, polyethylene naphthalate, glass, or metal.

In an embodiment, the present invention relates to a method for lubricating the passage of a container along a conveyor. This embodiment can include spraying an undiluted lubricant composition through a non-energized nozzle onto at least a portion of a container-contacting surface of the conveyor or to at least a portion of a conveyor-contacting surface of the container; the lubricant composition including: about 3 about 40 wt-% lipophilic compound; about 0.05 about 15 wt-% emulsifier, anionic surfactant, or mixture thereof; and about 55 to about 97 wt-% water.

In an embodiment, the present invention relates to a method for lubricating the passage of a container along a conveyor. This embodiment can include applying an undiluted lubricant composition to at least a portion of a container-contacting surface of the conveyor or to at least a portion of a conveyor-contacting surface of the container; conveying containers on the conveyor; washing or rinsing the conveyor and removing soil; continuing to convey containers after washing, conveying being conducted with a coefficient of friction of less than or equal to about 0.4; the lubricant composition including: about 3 about 40 wt-% lipophilic compound; about 0.05 about 15 wt-% emulsifier, anionic surfactant, or mixture thereof; and about 55 to about 97 wt-% water.

In an embodiment, the present invention relates to a composition. This embodiment of the composition can include: about 3 about 40 wt-% lipophilic compound; about 0.05 about 15 wt-% anionic surfactant; and about 55 to about 97 wt-% water. In an embodiment of the composition, the composition further includes emulsifier. In an embodiment of the composition, the lipophilic compound includes triglyceride. In an embodiment of the composition, the lipophilic compound includes tri(caprate/caprylate) ester of glycerine; caprylate, caprate, cocoate triglyceride; soyate fatty acid ester of sucrose; diheptanoate ester of poly(ethylene glycol); or trimethylol propane trioleate. In an embodiment of the composition, the anionic surfactant includes lecithin, oleyl-5EO-phosphate ester, short chain homopolymer of ricinoleic, or oleic acid. In an embodiment of the composition, the emulsifier includes ethoxysorbitan monostearate, glycerol monooleate, 20 mole ethoxylated castor oil, or mixture thereof. In an embodiment of the composition, the composition is PET compatible to the extent that it results in cracking of 4 or fewer bottles out of 56 in a stress cracking test for non-refillable PET bottles. In an embodiment of the composition, the composition is PET compatible to the extent that is graded A or B in a stress cracking test for refillable PET bottles.

Example 1—Conventional Lubricants Exhibited Unacceptable Increases in COF with Wear and Wetting A. Short Track Testing These experiments demonstrated that conventional lubricant compositions showed unacceptable increases in coefficient of friction as they were used and wetted. Anionic surfactants were demonstrated to improve the performance of even conventional lubricant compositions.

Materials and Methods

Short Track Test Method

The conveyor included dual 3¼ inch conveyor tracks and the conveyor speed was 158 feet/min. After running for 35 minutes following the start of application of the lubricant, the COF was measured using two 12 ounce bottles of Miller Genuine Draft Light beer (Initial COF). Sixty minutes after the start of application of the lubricant, which is 20 minutes after the start of the water spray, the COF was measured again (Worn and Wetted COF).

Lubricants

The conventional amine conveyor lubricant (sold under the tradename Lubodrive TK, Ecolab, St. Paul Minn.) was mixed with deionized water to form a solution at a concentration of 0.5 wt-%. The conventional amine lubricant included acidified fatty amine and alcohol ethoxylate surfactant.

The conventional phosphate ester conveyor lubricant (sold under the tradename Lubodrive RX, Ecolab, St. Paul Minn.) was mixed with deionized water to form a solution at a concentration of 0.25 wt-%. The conventional phosphate ester lubricant included neutralized phosphate ester and alcohol ethoxylate surfactant.

Glycerine was mixed with deionized water to form a solution at a concentration of 10 wt-%. A second glycerine composition included 10 wt-% glycerine and 0.5 wt-% Rhodafac PA/35 phosphate ester compound (Rhodia, Cranbury, N.J.). The phosphate ester compound included oleyl-5EO-phosphate ester.

The silicone (polydimethyl siloxane) emulsion lubricant composition was prepared by mixing 250 g of silicone emulsion (Lambent E2140FG food grade silicone emulsion, product of Lambent Technologies Corp.) with 750 g deionized water. A second silicone (polydimethyl siloxane) emulsion lubricant composition also included Rhodafac PA/35 phosphate ester compound. This second composition was prepared by adding 50 g of 10% Rhodafac PA/35 phosphate ester compound in deionized water and 250 g of Lambent E2140FG silicone emulsion to 700 g of deionized water. This formed a dispersion.

Results

The results obtained from these tests are shown in Table 1, below.

TABLE 1A

COF Increases For Conventional Lubricants

| Lubricant | Lipophilic Emulsion | Anionic Surfactant | Initial COF | Worn and Wetted COF |
|---|---|---|---|---|
| Amine | − | − | 0.25 | ≥0.5 |
| Phosphate ester | − | + | 0.27 | 0.51 |
| Glycerine | − | − | 0.34 | 0.53 |
| Glycerine and phosphate ester | − | + | 0.28 | 0.39 |
| Siloxane emulsion | − | − | 0.12 | 0.50 |
| Siloxane emulsion with phosphate ester | − | + | 0.13 | 0.35 |

In the test of the amine lubricant, seventy minutes after the start of application of the lubricant (30 minutes after the start of the water spray), the bottles fell over due to insufficient lubrication on the track.

Conclusions

The anionic surfactant was demonstrated to improve lubrication by conventional dry lube compositions. Including phosphate ester anionic surfactant in glycerine resulted in a smaller increase in COF. Including approximately 5000 ppm of a phosphate ester compound in the silicone lubricant was effective to diminish the increase in COF resulting from spraying water on a stainless steel conveyor track lubricated with an aqueous polydimethyl siloxane emulsion. For both of these conventional lubricants, the worn and wetted COF was significantly less than 0.5 when the lubricant included anionic surfactant.

B. Lubricity Testing of Conventional Wet Lubricants

These experiments demonstrated that traditional glass and metal wet lubricants do not work well (i.e. do not produce an acceptable low coefficient of friction) when run in a dry mode, that is when applied for a period of time, and then turned off for a period of time while containers and packages continue to be moved along the conveyor surface.

Materials and Methods

These experiments also tested a fatty amine lubricant (sold under the tradename LUBODRIVE TK™, Ecolab Inc., St. Paul, Minn.) at a concentration of 5 wt-%. This lubricant is commonly used as a wet lubricant on conveyors in bottling plants at a concentration of 0.1%. Thus, in this example, this lubricant is being tested as a dry lubricant at a concentrations 50 times the usual concentration. Higher lubricant concentration would be expected to improve the performance of the lubricant.

These experiments tested a fatty acid derivative lubricant (sold under the tradename of LUBOKLAR HH™, Ecolab Inc., St. Paul, Minn.) at concentrations of 2.5 wt-% and 5 wt-%. This lubricant is commonly used as a wet lubricant on conveyors in bottling plants at a concentration of 0.4%. Thus, in this example, this lubricant is being tested as a dry lubricant at concentrations 12 to 63 times the usual concentration. Higher lubricant concentration would be expected to improve the performance of the lubricant.

For this example, these lubricants were tested using the lubricity test with a glass bottle package on a stainless steel conveyor belt.

Results

The results are shown in Table 1B, below.

TABLE 1B

Wet Lubricant Compositions are Ineffective as Dry Lubricants

| Lubricant | Concentration [%] | COF |
|---|---|---|
| fatty amine | 5 | 0.18 |
| fatty acid derivative | 2.5 | 0.24 |
| fatty acid derivative | 5 | 0.27 |

Conclusions

Conventional glass lubricants do not work well in a "dry" mode even when the concentration was raised more than 10 times that of the typical use level.

C. Lubricity Testing of Conventional Dry Lubricants

These experiments demonstrated that dry lubricants made to be used with PET bottles on Delrin conveyors do not work well (i.e. do not produce an acceptable low coefficient of friction) when run in a dry mode with glass bottles on a stainless steel conveyor and subjected to applying ("spilling") water to the conveyor.

Materials and Methods

This experiment tested a glycerine lubricant (sold under the tradename LUBOTRAXX 125™, Ecolab Inc., St. Paul, Minn.) and a lubricant containing silicon and fatty amine (DRYEXX™, Ecolab Inc., St. Paul, Minn.) without diluting either lubricant.

For this example, these lubricants were tested using the lubricity test with a glass bottle package on a stainless steel conveyor belt.

Results

The results are shown in Table 1C, below.

TABLE 1C

Dry Lubricant Compositions are Ineffective After Water is Applied to the Conveyor

| Lubricant | Dry COF | COF After Water |
|---|---|---|
| glycerine | 0.10 | not measurable, so much friction that the bottles crashed on the conveyor |
| silicon and fatty amine | 0.25 | not measurable, so much friction that the bottles crashed on the conveyor |

Conclusions

Conventional dry lubricants do not work well after water is applied to the conveyor. Water or water-based beverages commonly spill on a conveyor in a bottling plant. Further, water is commonly used to wash beverage residues from beverage containers while the containers are on the conveyor, which gets water on the conveyor.

Example 2—Anionic Surfactant Improves Lubrication by a Lipophilic Emulsion

These experiments demonstrated that a phosphate ester anionic surfactant improved lubrication by a lipophilic emulsion. Specifically, the phosphate ester containing lubricant had a smaller increase in coefficient of friction upon use of the conveyor and wetting.

A. Short Track Testing

Materials and Methods

Short Track Test Method

The short track test method was as described above in Example 1.

Lubricants

Triglyceride Emulsion

A premix of triglyceride oil with emulsifiers was prepared by mixing 83.3 g of the tri(caprate/caprylate) ester of glycerine (LUMULSE CC33K, Lambent Technologies Corp.) with 10 g of glycerol monooleate (LUMULSE GMO), and 6.7 g of 20 mole ethoxylated castor oil (LUMULSE CO-25) and stirring until homogeneous.

Dispersing the premix was accomplished by pouring the clear straw colored liquid as a thin stream into 900 g of stirring deionized water to give a dispersion. The dispersion was microfluidized by processing using a M-110Y Microfluidizer® Processor microfluidizer equipped with a H210Z (200 micron) shear chamber followed by a blank chamber with an operating pressure of 5000 psi. When measured using a Horiba 910 particle size analyzer, the volume average particle size of the emulsion was determined to be 0.430 microns and the number average particle size was 0.294 microns.

To 1000 g of the resulting microfluidized emulsion were added 2.5 g of an isothiazolinone (sold under the tradename KATHON CG-ICP) and 25 g of a solution of 10% dimethyl lauryl amine (GENAMIN LA302-D, Clariant) plus 2.8% acetic acid in deionized water.

Triglyceride Emulsion Including Lecithin

An emulsion of the tri(caprate/caprylate) ester of glycerine made with lecithin (Deriphat DL10, product of Cognis GmbH, Manheim am Rhein, DE) was tested as received.

Results

The results obtained from these tests are shown in Table 2A, below.

TABLE 2A

Anionic Surfactant Improves Lubrication by a Lipophilic Emulsion

| Lubricant | Lipophilic Emulsion | Anionic Surfactant | Initial COF | Worn and Wetted COF |
|---|---|---|---|---|
| Triglyceride emulsion | + | − | 0.12 | 0.44 |
| Triglyceride emulsion with lecithin | + | + | 0.11 | 0.30 |

Conclusions

These results demonstrated that including a phosphate ester anionic surfactant (lecithin) in a glycerine tri(caprate/caprylate) ester emulsion diminished the increase in COF resulting from spraying water on a stainless steel conveyor track lubricated with the emulsion.

B. Lubricity Testing

These experiments demonstrated that anionic surfactants improved lubrication by a triglyceride lipophilic emulsion. Specifically, these lubricants were effective after water was applied to the conveyor.

Materials and Methods

This experiment tested two triglyceride lubricant compositions. Lubricant A contained an emulsion of 10 wt-% of a caprylate, caprate, cocoate triglyceride (sold under the tradename Myritol 331) in water to which was added the anionic surfactant 1.5 wt-% lecithin (sold under the tradename Terradrill V 408, Cognis) and the emulsifier 1.5 wt-% 20 mol ethoxysorbitan monostearate (sold under the tradename Tween 60V, ICI). Lubricant B contained 1.5 wt-% citrate ester (a carboxylic acid anionic surfactant) (sold under the tradename GRINDSTED® CITREM 2-IN-1, Danisco) instead of the Terradrill V408.

For this example, these lubricants were tested using the lubricity test with a glass bottle package on a stainless steel conveyor belt.

Results

The results are shown in Table 2B, below.

TABLE 2B

Triglyceride Lubricants Including Anionic Surfactant Were Effective After Water was Applied to the Conveyor.

| Lubricant | Dry COF | COF After Water |
|---|---|---|
| A | 0.10 | 0.12 |
| B | 0.09 | 0.10 |

Conclusions

Triglyceride lubricants including anionic surfactant worked well as dry conveyor lubricants. They effectively lubricated after water was applied to the conveyor.

Example 3—Anionic Surfactants Improved Lubrication by a Soyate Ester Lipophilic Emulsion These experiments demonstrated that anionic surfactants improved lubrication by a soyate ester lipophilic emulsion. Specifically, the anionic surfactant containing lubricants had a smaller increase in coefficient of friction upon use of the conveyor and spraying with water.
Materials and Methods
Short Track Test Method The short track test method was as described above in Example 1 except that the track was a single 6.5 inch wide track that ran at 127 feet/min.
Lubricants
Soyate Fatty Acid Ester Emulsion A premix of soyate fatty acid ester of sucrose with emulsifiers was prepared by mixing 83.3 g of the soyate fatty acid ester of sucrose compound (SEFOSE 1618S, product of Procter and Gamble Chemicals, Cincinnati, Ohio) with 10.9 g of glycerol monooleate (LUMULSE GMO-K, product of Lambent Technologies Corp., Gurnee, Ill.), and 5.9 g of 20 mole ethoxylated castor oil (LUMULSE CO-25, product of Lambent Technologies Corp.) and stirring until homogeneous.

The resulting clear amber liquid was dispersed and microfluidized as described in Example 2. To 1000 g of the resulting microfluidized emulsion was added 2.5 g of KATHON CG-ICP and 25 g of a solution of 10 wt-% dimethyl lauryl amine (GENAMIN LA302-D) plus 2.8% acetic acid in deionized water. When measured using a Horiba 910 particle size analyzer, the volume average particle size of the emulsion was determined to be 0.388 microns and the number average particle size was 0.281 microns.
Soyate Fatty Acid Ester Emulsion Containing Phosphate Ester A solution of 10% Rhodafac PA/35 phosphate ester in deionized water (50 g) was added to 950 g of the Sefose 1618S emulsion prepared above to give a Sefose 1618S plus phosphate ester emulsion.
Soyate Fatty Acid Ester Emulsion Containing Carboxylic Acid Surfactant A premix of soyate fatty acid ester of sucrose with emulsifiers was prepared by mixing 100 g of a soyate fatty acid ester of sucrose compound (SEFOSE 1618S) with 100 g of the short chain homopolymer of ricinoleic acid (Hostagliss L4, product of Clariant Corporation, Mount Holly, N.C.), 24 g of glycerol monooleate (LUMULSE GMO-K) and 16 g of 20 mole ethoxylated castor oil (LUMULSE CO-25) and stirring until homogeneous. The clear light straw colored liquid was poured as a thin stream into 754.2 g of stirring deionized water to give a dispersion. The dispersion was microfluidized as described in Example 2.
Results The results obtained from these tests are shown in Table 3, below.

TABLE 3

Anionic Surfactant Improves Lubrication by a Soyate Ester Lipophilic Emulsion

| Lubricant | Lipophilic Emulsion | Anionic Surfactant | Initial COF | Worn and Wetted COF |
| --- | --- | --- | --- | --- |
| Soyate fatty acid esters of sucrose | + | − | 0.16 | 0.36 |
| Soyate fatty acid esters of sucrose with phosphate ester | + | + | 0.10 | 0.23 |
| Soyate fatty acid esters of sucrose with carboxylic acid surfactant | + | + | 0.10 | 0.23 |

Conclusions

These results demonstrated that including anionic surfactants in a lipophilic emulsion of soyate fatty acid ester of sucrose diminished the increase in COF resulting from spraying water on a stainless steel conveyor track lubricated with the emulsion. Specifically, the improvements resulted from including approximately 5000 ppm of a phosphate ester compound in the emulsion and from including approximately 10 wt-% of a long chain carboxylic acid compound in the lipophilic emulsion.

Example 4—Anionic Surfactant Improved Lubrication by a PEG Ester Lipophilic Emulsion These experiments demonstrated that an anionic surfactant improved lubrication by a PEG ester lipophilic emulsion. Specifically, the anionic surfactant containing lubricants had a smaller increase in coefficient of friction upon use of the conveyor and spraying with water.
Materials and Methods
Short Track Test Method The short track test method was as described above in Example 1.
Lubricants
PEG Diheptanoate Ester Emulsion A premix of the diheptanoate ester of poly(ethylene glycol) was prepared by mixing 83.3 g of a PEG-4 diheptanoate (LIPONATE 2-DH, product of Lipo Chemicals, Inc., Paterson N.J.) with 9.2 g of glycerol monooleate (LUMULSE GMO-K), and 7.5 g of 20 mole ethoxylated castor oil (LUMULSE CO-25) and stirring until homogeneous.

The clear liquid was poured as a thin stream into 900 g of stirring deionized water to give a dispersion. The dispersion was microfluidized as described in Example 2. When measured using a Horiba 910 particle size analyzer, the volume average particle size of the emulsion was determined to be 3.031 microns and the number average particle size was 0.174 microns.
PEG Diheptanoate Ester Emulsion Containing Anionic Surfactant A solution of 10% Rhodafac PA/35 phosphate ester compound in deionized water was added to 950 g of the Liponate 2DH emulsion prepared above to give a Liponate 2DH plus phosphate ester emulsion.
Results The results obtained from these tests are shown in Table 4, below.

TABLE 4

Anionic Surfactant Improves Lubrication by a PEG Ester Lipophilic Emulsion

| Lubricant | Lipophilic Emulsion | Anionic Surfactant | Initial COF | Worn and Wetted COF |
| --- | --- | --- | --- | --- |
| PEG diheptanoate ester | + | − | 0.15 | 0.52 |
| PEG diheptanoate ester with phosphate ester | + | + | 0.12 | 0.23 |

Conclusions

These results demonstrated that including approximately 5000 ppm of a phosphate ester compound in a lipophilic emulsion of a PEG ester diminished the increase in COF resulting from spraying water on a stainless steel conveyor track lubricated with the emulsion.

Example 5—Anionic Surfactants Improved Lubrication by a Trioleate Ester Lipophilic Emulsion These experiments demonstrated that anionic surfactants improved lubrication by a PEG ester lipophilic emulsion. Specifically, the anionic surfactant containing lubricants had a smaller increase in coefficient of friction upon use of the conveyor and spraying with water.

Materials and Methods
Short Track Test Method

For the preparations made with the trioleate supplied by Cognis GmbH, the short track test method was as described above in Example 1 except that the track was a single 6.5 inch wide track that ran at 127 feet/min. Preparations made with the trioleate from Clariant were tested by the short track method of Example 1. Preparations containing the carboxylic acid surfactant were tested by the short track method of Example 1.

Lubricants
Trimethylol Propane Trioleate Emulsion

A first trioleate emulsion was prepared from a premix of trimethylol propane trioleate oil with emulsifiers, which was made by mixing 83.3 g of trimethylol propane trioleate (SYNATIVE ES 2964, product of Cognis GmbH, Manheim am Rhein, DE) with 9.1 g of glycerol monooleate (LUMULSE GMO-K), and 7.6 g of 20 mole ethoxylated castor oil (LUMULSE CO-25) and stirring until homogeneous. The clear light straw colored liquid was dispersed and microfluidized as described in Example 2.

To 1000 g of the resulting microfluidized emulsion were added 2.5 g of KATHON CG-ICP and 25 g of a solution of 10% dimethyl lauryl amine (GENAMIN LA302-D) plus 2.8% acetic acid in deionized water.

A second trioleate emulsion was made employing a the trimethylol propane trioleate a product sold under the tradename HOSTAGLISS TPO (Clariant (Australia) Pty. Ltd., Melbourne, Australia). Otherwise the ingredients in and method of making the second preparation was the same as the first. When measured using a Horiba 910 particle size analyzer, the volume average particle size of the emulsion was determined to be 0.424 microns and the number average particle size was 0.287 microns.

Trimethylol Propane Trioleate Emulsion Containing Phosphate Ester

A solution of 10% Rhodafac PA/35 phosphate ester compound in deionized water was added to 950 g of the first trioleate emulsion above to give first trioleate plus phosphate ester emulsion.

A solution of 10% Rhodafac PA/35 phosphate ester compound in deionized water was added to 950 g of the second trioleate emulsion above to give second trioleate plus phosphate ester emulsion.

Trimethylol Propane Trioleate Emulsion Containing Ricinoleic Acid Surfactant

A premix of trimethylol propane trioleate oil with fatty alkanolamide and long chain carboxylic acid compound surfactant was prepared by mixing 50 g of trimethylol propane trioleate (SYNATIVE ES 2964) with 60 g of the short chain homopolymer of ricinoleic acid (Hostagliss L4) and 30 g of a mixture of diethanolamine plus fatty acid alkanolamide (Hostacor DT, product of Clariant Corporation, Mount Holly, N.C.). The premix was warmed to 120 F with stirring to give a clear amber colored liquid. The premix solution was poured as a thin stream into a stirring solution of 150 g of hexylene glycol plus 710 g of deionized water to give a dispersion. The dispersion was hazy light yellow in color and exhibited a Tyndall effect when viewed with a laser pointer.

Trimethylol Propane Trioleate Emulsion Containing Oleic Acid Surfactant

A premix of trimethylol propane trioleate oil with emulsifiers was prepared by mixing 168 g of trimethylol propane trioleate (SYNATIVE ES 2964) with 18.2 g of glycerol monooleate (LUMULSE GMO-K), and 15.2 g of 20 mole ethoxylated castor oil (LUMULSE CO-25) and stirring until homogeneous. The clear light straw colored liquid was poured as a thin stream into 800 g of stirring deionized water to give a dispersion. The dispersion was microfluidized by the procedure of Example 2. A lubricant solution was prepared by adding a solution consisting of 5 g of monoethanolamine, 25 g of oleic acid, and 585 g of deionized water to 385 g of the dispersion.

Results

The results obtained from these tests are shown in Table 5, below.

TABLE 5

Anionic Surfactant Improves Lubrication by a Trioleate Ester Lipophilic Emulsion

| Lubricant | Lipophilic Emulsion | Anionic Surfactant | Initial COF | Worn and Wetted COF |
|---|---|---|---|---|
| Trimethylol propane trioleate | + | − | 0.11<br>0.11[1] | 0.45<br>0.45[1] |
| Trimethylol propane trioleate with phosphate ester | + | + | 0.10<br>0.10[1] | 0.38<br>0.19[1] |
| Trimethylol propane trioleate with ricinoleic acid surfactant | + | + | 0.14 | 0.18 |
| Trimethylol propane trioleate with oleic acid surfactant | + | + | 0.11 | 0.14 |

[1]second emulsion or composition

Conclusions

These results demonstrated that including approximately 5000 ppm of a phosphate ester compound in a lipophilic emulsion of a trioleate ester diminished the increase in COF resulting from spraying water on a stainless steel conveyor track lubricated with the emulsion.

These results also demonstrated that including approximately 6 wt-% (ricinoleic acid) or 2.5 wt-% (oleic acid) of a long chain fatty acid surfactant diminished the increase in COF resulting from spraying water on a stainless steel conveyor track lubricated with trimethylol propane trioleate ester emulsion.

Example 6—Anionic Surfactant Improved Lubrication by a Mineral Oil Lipophilic Emulsion These experiments demonstrated that an anionic surfactant improved lubrication by a mineral oil lipophilic emulsion. Specifically, the anionic surfactant containing lubricants had a smaller increase in coefficient of friction upon use of the conveyor and spraying with water.

Materials and Methods
Short Track Test Method

The short track test method was as described above in Example 1.

Lubricants

A lubricant emulsion was prepared by mixing 100 g of Asepti Lube mineral oil (product of Ecolab, St. Paul Minn.)

with 900 g deionized water. A mineral oil emulsion containing phosphate ester was prepared by adding 50 g of 10% Rhodafac PA/35 phosphate ester compound in deionized water and 100 g of Asepti Lube mineral oil to 850 g of deionized water.

Results

The results obtained from these tests are shown in Table 6, below.

TABLE 6

Anionic Surfactant Improves Lubrication by a Mineral Oil Lipophilic Emulsion

| Lubricant | Lipophilic Emulsion | Anionic Surfactant | Initial COF | Worn and Wetted COF |
|---|---|---|---|---|
| Mineral oil emulsion | + | − | 0.14 | 0.49 |
| Mineral oil emulsion with phosphate ester | + | + | 0.12 | 0.25 |

Conclusions

These results demonstrated that including approximately 5000 ppm of a phosphate ester compound in a lipophilic emulsion of mineral oil diminished the increase in COF resulting from spraying water on a stainless steel conveyor track lubricated with the emulsion.

Example 7—Compositions of the Present Invention are PET Compatible

This experiment demonstrated that a conveyor lubricant composition according to the present invention exhibited an advantageous low level of stress cracking in a standard test for compatibility with PET bottles.

Materials and Methods

Pet Stress Crack Test

Compatibility of aqueous compositions with PET beverage bottles was determined by charging bottles with carbonated water, contacting with the lubricant composition, storing at elevated temperatures and humidity for a period of 28 days, and counting the number of bottles that either burst or leaked through cracks in the base portion of the bottle. Standard twenty ounce "contour" bottles (available from Southeastern Container, Enka N.C.) were charged with carbonated water from a Manitowac 44MW04 table top carbonator using pre-chilled water at a fill rate of 30 seconds per bottle. The temperature of carbonated water exiting the carbonator was between 0.3 and 0.5° C. The carbonation level was adjusted by increasing or decreasing the input carbon dioxide pressure to give bottles with carbonation pressure of 70±3 psi when measured at 70° F. using a Zahm-Nagel Series 11000 piercing device.

After charging, all bottles were stored under ambient conditions (20-25° C.) overnight. Twenty four bottles thus charged were swirled for approximately five seconds in test composition, whereupon they were wetted with test composition up to the seam which separates the base and sidewall portions of the bottle, then placed in a standard bus pan (part number 4034039, available from Sysco, Houston Tex.) lined with a polyethylene bag. For each composition tested, a total of four bus pans of 24 bottles were used. Immediately after placing bottles and test aqueous composition into bus pans, the bus pans were moved to an environmental chamber under conditions of 100° F. and 85% relative humidity. Bins were checked on a daily basis and the number of failed bottles (burst or leak of liquid through cracks in the bottle base) was recorded.

In a modified PET Stress Crack Test, a case of 18 bottles (or 3 cases totaling 54 bottles) of Coors Lite in PET bottles were allowed to warm to room temperature and individual bottles were wetted with test aqueous composition up to the seam which separates the base and sidewall portions of the bottle, then returned to the plastic lined case, after which the bottles were moved to an environmental chamber under conditions of 100° F. and 85% relative humidity. Bins were checked on a daily basis and the number of failed bottles (burst or leak of liquid through cracks in the bottle base) was recorded.

Lubricant

A lubricant emulsion was prepared by adding 300.0 g of the tri(caprate/caprylate) ester of glycerine made with lecithin (Deriphat DL10, product of Cognis GmbH, Manheim am Rhein, DE) and 50.0 g of Lubodrive TK to 650.0 g of deionized water.

Results

The lubricant composition was tested using the PET Stress Crack Test as described above wherein after 28 days of testing at 100 F and 85% relative humidity, no bottles failed out of 96 tested.

In a separate experiment, the lubricant composition was tested in a modified PET Stress Crack Test using Coors Lite packaged in 16 ounce in PET bottles. At the end of 28 days of testing at 100 F and 85% using the modified PET Stress Crack Test, no bottles had failed.

Conclusion

These results demonstrate that a lubricant emulsion containing Deriphat DL10 and Lubodrive TK provided excellent PET compatibility.

Example 8—Compositions of Present Invention are Compatible with Refillable PET Bottles This experiment demonstrated that a conveyor lubricant composition according to the present invention exhibited an advantageous low level of stress cracking in a standard test for compatibility with refillable PET bottles.

Materials and Methods

Refillable Pet Stress Crack Test

Compatibility of aqueous compositions with refillable PET beverage bottles was determined by charging bottles with carbonated water, contacting with the lubricant composition, storing at elevated temperatures and humidity for a period of 51 days, and evaluated the degree of crazing of the bottle. Standard refillable 1.5 L bottles (available from Amcor PET Packaging Deutschland GmbH, Mendig, DE) were charged with carbonated water. The carbonated water was produced by a solution of 22.5 g sodium hydrogen carbonate and 35.62 g phosphoric acid in 1500 g DI-water. The carbonated water had a content of 4.0 vol-% of $CO_2$. 23 Bottles were filled with carbonated water.

For bottles 1, 12 and 23 the $CO_2$ content was measured by a $CO_2$ measuring device (available from Steinfurth Mess-System GmbH, Essen, DE). The remaining 20 bottles were stored in an environmental chamber at 22° C. for 24 hours. The lube will be applied on a plate with 6 g/m$^2$. The bottles are placed on the surface for 5 minutes. The bottles were removed and placed into a crate. The crate with the bottles was stored in climate chamber (available from Binder GmbH, Tuttlingen, DE) at 38° C. and 85% RH. After 7 days the bottles were dipped again in the lube solution. After repeating this procedure 7 times in 49 days, the bottles were stored for one day in the climate chamber and the degree of crazing was evaluated for each sample. The evaluation of the degree of crazing was done according the Coca Cola-Line Lubrication Stress Crack Test. Four categories are established A, B, C, D. A: Minor, very shallow crazing; B: Moderate, shallow crazing; C: Major, moderately deep crazing; D: Major deep crazing.

Lubricant

A lubricant emulsion was prepared by adding 300.0 g of the tri(caprate/caprylate) ester of glycerine made with lecithin (Deriphat DL10, product of Cognis GmbH, Monheim am Rhein, DE) and 50.0 g of Lubodrive TK to 650.0 g of deionized water.

Results

At the end of 51 days of testing at 38° C. at 85% relative humidity using the above described test method, the degree of crazing of all tested bottles was for all bottles at category A (minor, very shallow cracks).

What this example shows is that a lubricant emulsion containing Deriphat DL10 and Lubodrive TK provides excellent PET compatibility.

Conclusion

These results demonstrate that a lubricant emulsion containing Deriphat DL10 and Lubodrive TK provided excellent PET compatibility with refillable PET beverage bottles.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

We claim:

1. A method for lubricating the passage of a container along a conveyor comprising:
applying a lubricant composition to at least a portion of a container-contacting surface of the conveyor or to at least a portion of a conveyor-contacting surface of the container, the lubricant composition comprising mineral oil wherein the lubricant composition is free of silicone and free of water.

2. The method of claim 1, wherein applying comprises spraying, brushing, wiping, dripping, or roll coating the composition onto the conveyor or the container.

3. The method of claim 1, wherein applying comprises coating at least a portion of the conveyor surface with the lubricant composition.

4. The method of claim 1, wherein the composition further comprises an additional functional ingredient.

5. The method of claim 4, wherein the additional functional ingredient is selected from the group consisting of emulsifiers, antimicrobial agent, cracking inhibitor, antioxidant, and mixtures thereof.

6. The method of claim 1, wherein the composition creates a coefficient of friction on the conveyor of less than about 0.4.

7. The method of claim 1, wherein the container comprises polyethylene terephthalate, polyethylene naphthalate, glass, paper, metal, or a combination thereof.

8. The method of claim 5, wherein the emulsifier is selected from the group consisting of phosphate esters, carboxylic acids, polyol, polyalkylene glycol, linear copolymer of ethylene and propylene oxides, alcohol ethoxylate, alcohol propoxylate, sorbitan ester, fatty acid, and derivatives and mixtures thereof.

9. A method for lubricating the passage of a container along a conveyor comprising:
coating at least a portion of a conveyor surface with a lubricant composition comprising mineral oil wherein the lubricant composition is free of water and silicone.

10. The method of claim 9, wherein the composition further comprises an additional functional ingredient.

11. The method of claim 10, wherein the additional functional ingredient is selected from the group consisting of emulsifiers, antimicrobial agent, cracking inhibitor, antioxidant, and mixtures thereof.

12. The method of claim 9, wherein the composition creates a coefficient of friction on the conveyor of less than about 0.4.

13. The method of claim 9, wherein the container comprises polyethylene terephthalate, polyethylene naphthalate, glass, paper, metal, or a combination thereof.

14. The method of claim 11, wherein the emulsifier is selected from the group consisting of phosphate esters, carboxylic acids, polyol, polyalkylene glycol, linear copolymer of ethylene and propylene oxides, alcohol ethoxylate, alcohol propoxylate, sorbitan ester, fatty acid, and derivatives and mixtures thereof.

15. A method for lubricating the passage of a container along a conveyor comprising:
applying a lubricant composition at least to a portion of a surface selected from the group consisting of a container-contacting surface of the conveyor, an underside of the conveyor belt chain link, a container, a wear strip, and a combination thereof, the lubricant composition comprising:
mineral oil, wherein the lubricant composition is free of silicone and free of water,
wherein the conveyor is made of stainless steel, plastic, or combinations thereof.

16. The method of claim 15, wherein applying comprises spraying, brushing, wiping, dripping, or roll coating the composition onto the conveyor or the container.

17. The method of claim 15, wherein applying comprises applying the composition to the wear strip.

18. The method of claim 15, wherein the composition further comprises an additional functional ingredient selected from the group consisting of emulsifiers, antimicrobial agent, cracking inhibitor, antioxidant, and mixtures thereof.

19. The method of claim 15, wherein the composition creates a coefficient of friction between a container and the container-contacting surface of the conveyor of less than about 0.4.

20. A method for lubricating the passage of a container along a conveyor comprising:

applying a lubricant composition to at least to a portion of a surface selected from the group consisting of a container-contacting surface of the conveyor, an underside of the conveyor belt chain link, a container, a wear strip, and a combination thereof, the lubricant composition comprising mineral oil, wherein the lubricant composition is free of silicone and free of water, wherein applying the lubricant composition forms a film or coating on the container-contacting surface of the conveyor, and wherein the container comprises polyethylene terephthalate, polyethylene naphthalate, glass, paper, metal, or a combination thereof.

21. The method of claim 20, wherein the composition creates a coefficient of friction on the conveyor of less than about 0.4.

22. The method of claim 20, wherein the composition further comprises an additional functional ingredient selected from the group consisting of emulsifiers, antimicrobial agent, cracking inhibitor, antioxidant, and mixtures thereof.

\* \* \* \* \*

UNITED STATES PATENT AND TRADEMARK OFFICE
CERTIFICATE OF CORRECTION

| | |
|---|---|
| PATENT NO. | : 11,685,875 B2 |
| APPLICATION NO. | : 17/647973 |
| DATED | : June 27, 2023 |
| INVENTOR(S) | : Stefan Seemeyer et al. |

It is certified that error appears in the above-identified patent and that said Letters Patent is hereby corrected as shown below:

In the Specification

Column 1, Line 12: U.S. application Serial No. 16/281,773 should read --U.S. Serial No. 16/281,733--

Signed and Sealed this
Twenty-sixth Day of November, 2024

Katherine Kelly Vidal
*Director of the United States Patent and Trademark Office*